United States Patent
White

(10) Patent No.: US 9,288,480 B2
(45) Date of Patent: Mar. 15, 2016

(54) VISUAL DISPLAYS AND TELEPRESENCE EMBODIMENTS WITH PERCEPTION OF DEPTH USING ONE OR MORE REFLECTED SURFACE

(71) Applicant: TelePresence Technologies, LLC, Plano, TX (US)

(72) Inventor: Peter McDuffie White, McKinney, TX (US)

(73) Assignee: TelePresence Technologies, LLC, Plano, TX (US)

( * ) Notice: Subject to any disclaimer, the term of this patent is extended or adjusted under 35 U.S.C. 154(b) by 233 days.

(21) Appl. No.: 13/957,149

(22) Filed: Aug. 1, 2013

(65) Prior Publication Data

US 2013/0314782 A1 Nov. 28, 2013

Related U.S. Application Data

(63) Continuation of application No. 12/789,131, filed on May 27, 2010, now Pat. No. 8,520,064.

(60) Provisional application No. 61/308,566, filed on Feb. 26, 2010, provisional application No. 61/227,377, filed on Jul. 21, 2009.

(51) Int. Cl.
  *H04N 13/04* (2006.01)
  *G02B 27/22* (2006.01)
  *H04N 7/14* (2006.01)

(52) U.S. Cl.
  CPC ............... *H04N 13/04* (2013.01); *G02B 27/22* (2013.01); *G02B 27/2292* (2013.01); *H04N 7/144* (2013.01)

(58) Field of Classification Search
  USPC .......................................................... 348/54
  See application file for complete search history.

(56) References Cited

U.S. PATENT DOCUMENTS

| | | |
|---|---|---|
| 4,572,632 A | 2/1986 | Bodier et al. |
| 4,580,880 A | 4/1986 | Watson |
| 5,532,438 A | 7/1996 | Brown |
| 5,549,004 A | 8/1996 | Nugent |
| 6,104,424 A | 8/2000 | McNelley |
| 6,809,419 B2 | 10/2004 | Minami et al. |
| 2002/0191390 A1 | 12/2002 | Newhouse et al. |
| 2006/0181607 A1 | 8/2006 | McNelley et al. |
| 2006/0245745 A1 | 11/2006 | Mazon |
| 2008/0117486 A1 | 5/2008 | Andoh et al. |
| 2008/0144203 A1 | 6/2008 | Williams |
| 2009/0273724 A1 | 11/2009 | Kawahara et al. |
| 2011/0012988 A1 | 1/2011 | Gorzynski et al. |

*Primary Examiner* — Dave Czekaj
*Assistant Examiner* — Leron Beck
(74) *Attorney, Agent, or Firm* — Slater & Matsil, L.L.P.

(57) ABSTRACT

System and method for a visual display system with a two-way mirror, which is between the observation zone and the image display device, positioned at an angle to reflect a backdrop surface that may be wider than the image display device or a backdrop with mirrored sides to extend the visual perception of the backdrop surface. A camera may be included with the visual display system for telepresence applications. The two-way mirror may extend into wall panels on the sides to form a room that appears to extend in depth by the reflection of the wall panels and a backdrop panel.

19 Claims, 19 Drawing Sheets

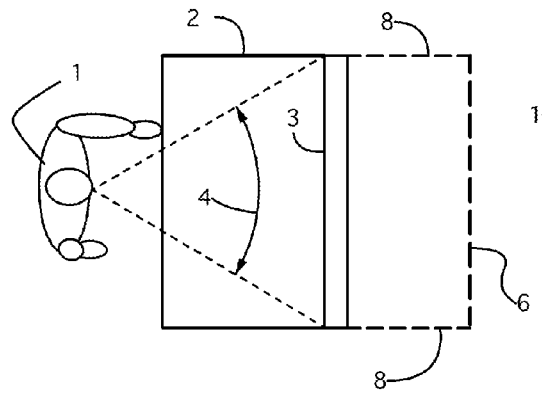
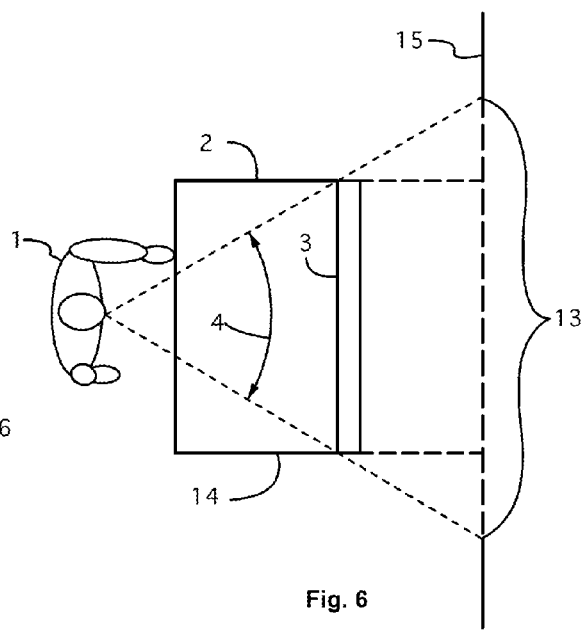
Fig. 5
Fig. 6
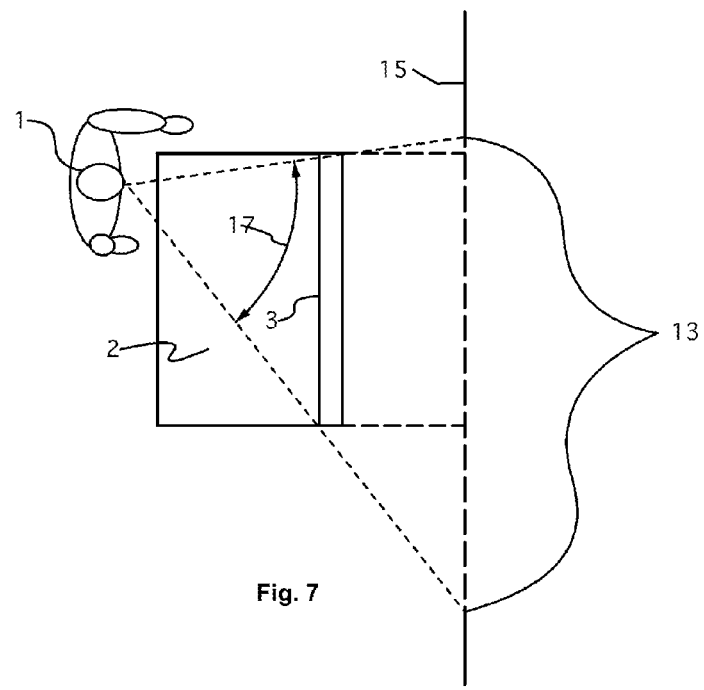
Fig. 7

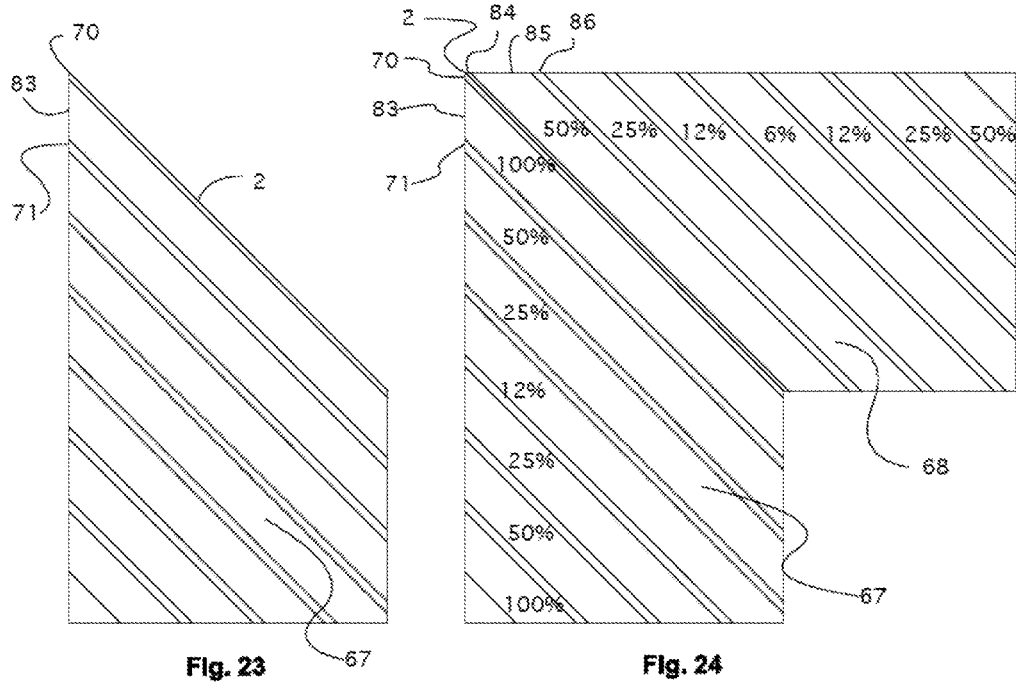
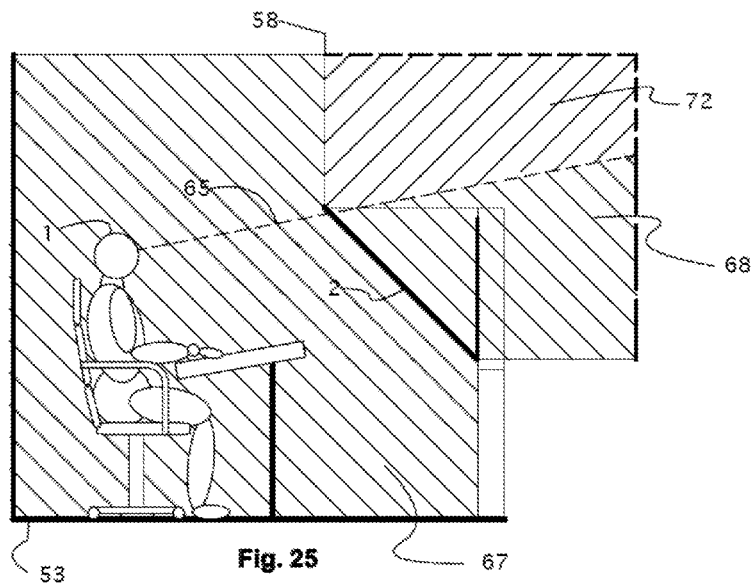
Fig. 23  Fig. 24
Fig. 25

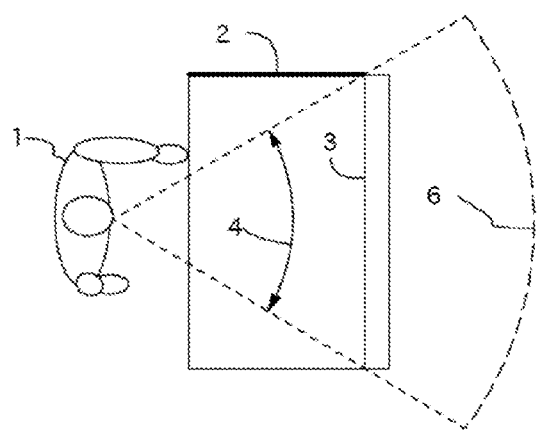
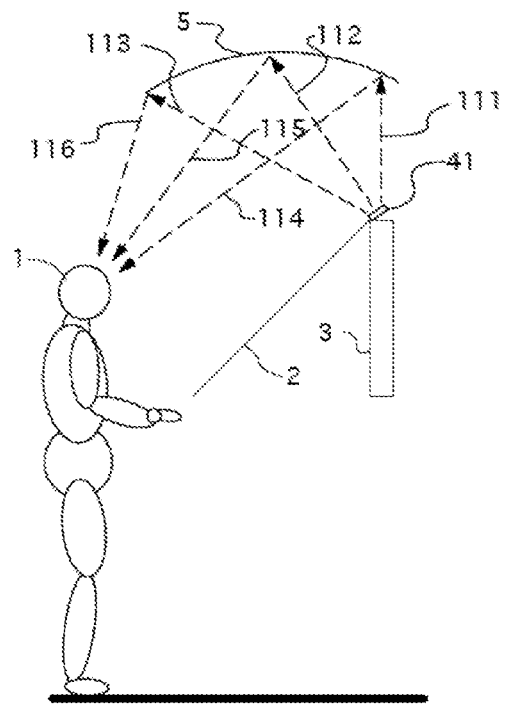
Fig. 42
Fig. 43
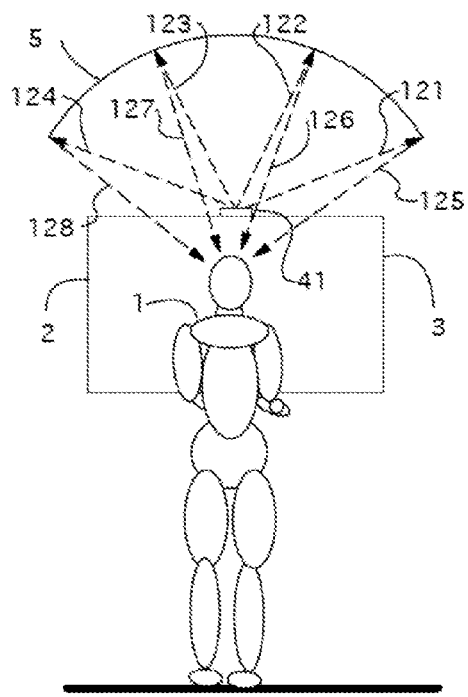
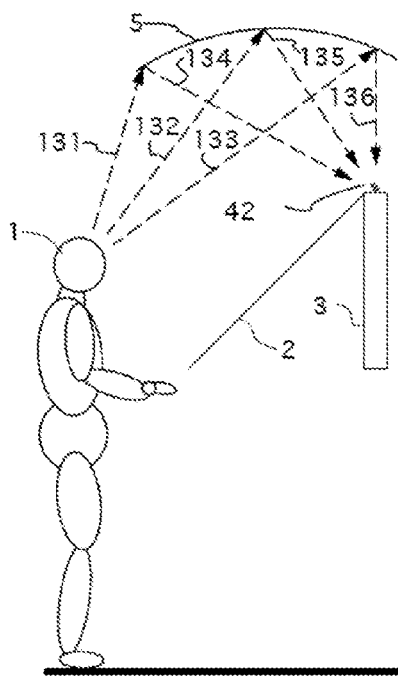
Fig. 44
Fig. 45

VISUAL DISPLAYS AND TELEPRESENCE EMBODIMENTS WITH PERCEPTION OF DEPTH USING ONE OR MORE REFLECTED SURFACE

This application is a continuation of U.S. patent application Ser. No. 12/789,131, filed on May 27, 2010, entitled "Visual Displays and TelePresence Embodiments with Perception of Depth," which claims priority to and the benefit of U.S. Provisional Application No. 61/308,566, filed on Feb. 26, 2010, entitled "Visual Displays and TelePresence Embodiments with Perception of Depth" and U.S. Provisional Application No. 61/227,377, filed on Jul. 21, 2009, entitled "Visual Displays and TelePresence Embodiments with Perception of Depth," which applications are hereby incorporated in their entireties herein by reference.

TECHNICAL FIELD

The present invention relates generally to visual displays. More particularly, the present invention relates to visual display systems that have a perception of depth between the displayed imagery and a superimposed background.

BACKGROUND

There is a need for new display systems that will attract attention for marketing and promotional purposes. In an age where video monitors used for digital signage are omnipresent in businesses, stores and public places, it is difficult to catch the eye of consumers and business prospects. One approach is to install visual display systems that generate three dimensional imagery. These 3D display systems are more effective at standing out from other flat display systems.

Most prior art systems are limited in their effectiveness. Lenticular arrays placed on photographic prints or backlit transparencies with vertical strips of images can produce stereoscopic imagery. These same lenticular arrays that are aligned to vertical rows of pixels in high definition LCD monitors can produce moving autostereoscopic images. Both of these display systems are limited in resolution as a single stereoscopic image comprised of multiple views with offset perspectives.

Another technique originated in the 1800's is a Pepper's Ghost display. A two-way mirror is used to superimpose a reflected image into a three dimensional setting. This has the distinct limitation of controlling the lighting of the three dimensional setting and, therefore, is not practical in most locations for commercial applications.

These Pepper's Ghost configurations do not meet the requirements of media savvy consumers and business executives. There is a need to be able to integrate high definition imagery in a format that is not compromised by lighting conditions in public places. Furthermore, there is a need to provide visual display systems that connect to the global networks to provide live content and engaging two-way communication.

SUMMARY OF THE INVENTION

The problems and needs outlined above are addressed by preferred embodiments of the present invention. In accordance with one aspect of the present invention, there is provided an image display device that may be viewed through a two-way mirror. The embodiment of the invention may be in the configuration of a kiosk. The two-way mirror may be angled so that the reflection is viewed of an enclosure above. This enclosure may have a backdrop.

The backdrop is positioned further from the two-way mirror than the image display device. When viewed the user will see the direct view of the image display device through the two-way mirror with the superimposed reflection of the backdrop enclosure. Because of the positions of the image display device and the backdrop relative to the two-way mirror, the image display device will appear to be closer than the superimposed reflection of the backdrop, which will result in a measurable depth relationship.

The backdrop may have sides that extend from the edge of the plane of the backdrop toward the two-way mirror. The edge close to the two-way mirror may be the same distance from the two-way mirror as the forward edge of the sides of the image display device. In this configuration the superimposed reflected image of the sides of the extension of the backdrop may be perceived to match in alignment to the direct view of the black edge of the image display device. As a result, the visible edge will be the brighter image of the edge of the extension of the backdrop. This will give the impression that the image on the image display device is floating within the box formed by the reflected sides of the backdrop. The sides of the backdrop extension may be light enough in value and illuminated adequately to provide a visual presence that is brighter than the black surface of the image display device.

This display configuration may be most effective if the image displayed on the image display device is a bright subject surrounded by black. This could be produced by having a well lit person captured on camera with a black backdrop behind them. In addition to images of people, it can be very effective to display photographic or computer generated images of objects on a black background. Other depth cues, such as a motion sequence of rotating a three dimensional object or 3D graphics, can augment the 3D visual effect. When the frame of the image display device is covered with light absorbing material, such as black felt, the surrounding black area of the image on the image display device and the black frame will not be seen as a light surface. When the reflected backdrop is superimposed in the view the user will more clearly see the reflection of the illuminated backdrop than the black area of the image display device.

In another embodiment of the invention the sides of the extension of the backdrop enclosure may each be covered with a mirror. The mirrors will reflect the backdrop so that it appears to extend outward as a series of reflections of the backdrop. This can eliminate the visual effect of the foreground image on the image display device from appearing to be contained in a box. It may be possible to place the kiosk or other embodiment of the invention at a position that is a set distance from a wall, which matches the distance to the viewed reflection of the backdrop. In this manner the backdrop and the wall may appear to be one seamless vertical plane.

In another aspect of the present invention the backdrop may be placed below a two-way mirror. This has the advantage of minimizing the overall height of a kiosk or other configuration of the invention.

In yet another aspect of the present invention the mirrored sides of the extension for the backdrop are angled inward and form the shape of trapezoids. The reflections in the mirrored sides of the backdrop extensions are repeated at an angle that results in a visual effect of a very large sphere. When the backdrop is an image display device that can show moving sequences, the large sphere can be filled with the repetition of the moving images.

The inward angle of the sides may be calculated to determine an exact size of the visual sphere. This radius may be determined by the projection of the angle of the mirrored sides to converge at the position of the center of the sphere.

Small sources of light, such as fiber optic ends or small LED lights, can protrude through points in the mirror to create a visual effect of a star field appearing to float outside of the visual sphere.

In a more advanced aspect of the present invention, a camera, codec, speaker and microphone may be integrated into the visual display system, such as a kiosk. This communications equipment may be used to transmit and display live images of people for two-way communication. When the presenter is captured with an eye level camera system, such as a teleprompter or telepresence system using a two-way mirror, the user at the kiosk may see a live person at life-size to interact in two-way communication with perceived eye contact.

One advantage of this telepresence kiosk is that it may be used to present a company representative in an office location. As an example, a telepresence kiosk could be used as a reception desk for a receptionist to appear in a reception lobby. Rather than employing a receptionist for every lobby in a large organization, one receptionist could provide services to many lobbies through telepresence. This same telepresence kiosk could be used at night by security guards to monitor activities at the entrances to numerous building locations.

Another advantage of the telepresence kiosk is that it could provide customer support in stores, shopping malls or public places. The telepresence kiosk could be used by customers to reach technical specialists or customer services representatives. By being connected to a national telepresence network with company representatives at telepresence centers, a customer at a telepresence kiosk could gain access to many company representatives that may not be at each store location.

Another aspect of the present invention may be in the embodiment of a telepresence module. This may be similar to the size of a photo booth, but with two-way communications equipment. The telepresence module may have a camera positioned below a two-way mirror. This camera may have a reflected view upward by means of a front surface mirror or roof prism. This upward camera view may be reflected forward off a two-way mirror to the area of a user. Behind the user may be a black panel or a Chromakey background.

It may be advantageous to keep the size of the telepresence module to a minimum. However, the user should not feel as if they are in a confined space, such as a telephone booth or typical photo booth. This embodiment of the present invention creates an illusion that the telepresence module is actually twice as large as its physical size. This may be achieved with the placement of a vertical mirror above the two-way mirror. It may be possible to match the reflected upper portion of the room in the upper mirror with the position of the vertical wall section reflected in the two-way mirror to create the illusion of a continuous wall at the far side of the telepresence module. This has the distinct advantage of giving the users the perception of being in a spacious room while keeping the cost of the telepresence module to a minimum to reduce the cost of construction and minimize the space required for the installation.

With the extension of the two-way mirror into the sides of the walls, the user will not see the edges of the two-way mirror. With a specially designed pattern on the wall it may be possible to obscure the location of the intersection of the two-way mirror with the side walls.

Embodiments of the present invention incorporate innovations for the incorporation of collaboration systems in the telepresence experience. This may be a table with touch screens, Microsoft Surface systems, or other collaborative solutions. These may be positioned so that the users are still clearly visible on camera. Internal lighting may be positioned to avoid reflections on the collaborative work surface.

In another embodiment of the present invention a larger telepresence module or room may incorporate one or more additional rows of seating. With this larger configuration groups will be able to communicate with eye contact.

One application of the telepresence modules is for a large scale network of public access telepresence locations. By having telepresence modules installed in numerous facilities around the country and eventually around the world, people could engage in an improved form of communication. This could drive new business models for delivering services. This concept of telepresence network architecture is presented in detail in patent application Ser. No. 11/860,366, filed on Sep. 24, 2007, entitled "3-D Displays and TelePresence Systems and Methods Therefore" by White, which application is hereby incorporated herein by reference for all purposes.

In another aspect of the present invention the overhead backdrop may be formed in a concave curve to serve as a reflector to focus sound from an audio speaker. This configuration can solve a critical need for a kiosk that serves as a communications solution. Most kiosks are located in public places where there is ambient noise. This poses a problem for users of a kiosk for communication since it may be difficult to hear the representative displayed on the system. If the volume is increased this may be objectionable to the staff and customers in the store. Furthermore, the user may not want the conversation broadcast in the public area to be heard by other people. This problem may be solved by focusing the sound to the zone of the head of the user. By calculating the curvature of the overhead panel it may be possible to reflect the sound projected from an audio speaker to zone of the head of the user.

Another advantage of the concave backdrop is that it can reflect the voice of the user to a focal point that may be the location of a microphone. In this manner the voice of the user can be captured for transmission to the location of the representative appearing on the kiosk. This is particularly important for two way communication with a user located in a public place with ambient noise.

BRIEF DESCRIPTION OF THE DRAWINGS

The above features of the present invention will be more clearly understood from consideration of the following descriptions in connection with accompanying drawings in which:

FIG. 5 illustrates a plan view of FIGS. 1 and 2;

FIG. 6 illustrates a plan view of FIGS. 3 and 4;

FIG. 7 illustrates another plan view of FIGS. 3 and 4 with a user viewing offset to the side;

FIG. 23 illustrates the pattern of lines as a series of slats with a space between the front surface of the two-way mirror and a repetition of this space as twice as wide between subsequent slats;

FIG. 24 illustrates the reflection of the pattern of slats with the space between them appearing to be equal in all positions;

FIG. 25 illustrates the wall surface covered with a series of lines at 45 degrees with the correct repetition of the pattern in the 45 degree two-way mirror, but an incorrect orientation reflected in a vertical mirror;

FIG. 42 illustrates a plan view of FIG. 41;

FIG. 43 illustrates a side view with sound from an audio speaker being focused by the reflection in the curved backdrop toward the user;

FIG. 44 illustrates a front view with sound from an audio speaker being focused by the reflection in the curved backdrop toward the user;

FIG. 45 illustrates a side view of FIGS. 43 and 44 with sound from the user being focused by the reflection in the curved backdrop toward the microphone;

DETAILED DESCRIPTION OF ILLUSTRATIVE EMBODIMENTS

Figure 1:
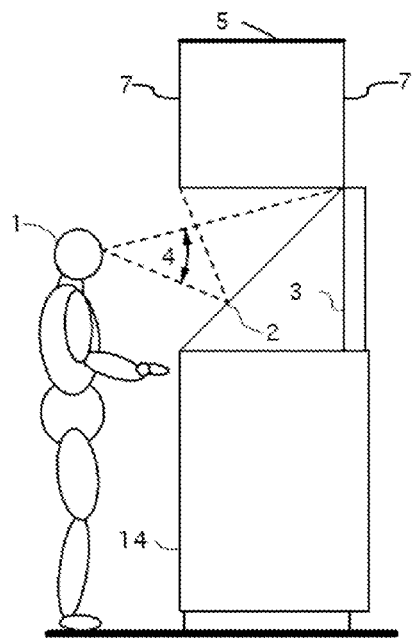
FIG. 1 illustrates a first embodiment of the present invention with a user viewing forward to see a reflection in a two-way mirror of an enclosure extending upward to position a backdrop a distance from the image display device.

Referring now to the drawings, wherein like reference numbers are used to designate like elements throughout the various views, several embodiments of the present invention are further described. The figures are not necessarily drawn to scale, and in some instances, the drawings have been exaggerated or simplified for illustrative purposes only. One of ordinary skill in the art will appreciate the many possible applications and variations of the present invention based on the following examples of possible embodiments of the present invention.

FIG. 1 shows a kiosk 14, however the same innovations of embodiments of the invention could be applied to a large fixed installation within a building, a theatrical set on a stage, a small retail display on a counter, or many other configurations.

In this illustration a user 1 stands next to a kiosk 14 and looks forward with an angle of view 4, which is reflected on a two-way mirror 2 angled to view a reflection of a backdrop enclosure 7. The two-way mirror 2 may be a transparent substrate with a semi-reflective surface. It is preferred that the semi-reflective surface is on the front exposed surface of the transparent substrate. The transparent substrate may be a sheet of glass, plastic, Mylar, stretched film or other transparent material. A two-way mirror 2 may also be called a one-way mirror or beamsplitter.

The user may see through the two-way mirror 2 to an image display device 3, which may be a plasma monitor, CRT monitor, LCD monitor, OLED monitor, rear projection screen, front projection screen or other device capable of generating a computer generated, film or video image.

The backdrop enclosure 7 has a horizontal plane that is viewed from the inside at a backdrop surface 5. The backdrop may be a front illuminated surface, which could be a graphic or photographic image. It could be an opaque surface, such as wood, concrete, fabric, cardboard, etc. The backdrop could be a flat surface or could have variations in depth to provide texture or artistic sculptural forms. The backdrop could be a back illuminated graphic or photographic image. Or it could be a back illuminated surface that could have translucency and/or transparency. The backdrop could be an image display device showing a series of static images or full motion imagery or it could be a set of multiple image display devices. The backdrop could be a combination of several surfaces and/or image devices.

Figure 2:
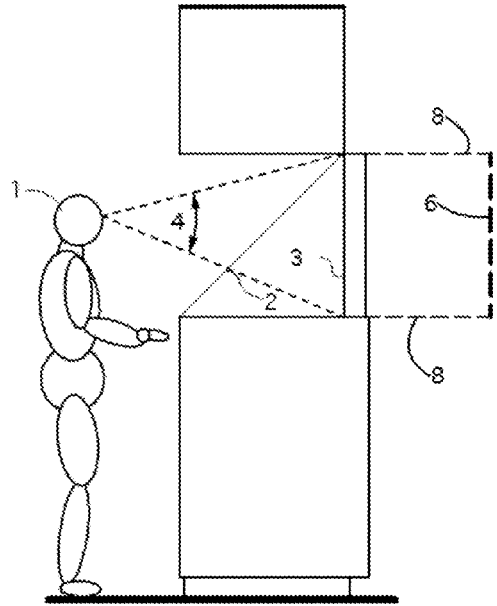
FIG. 2 illustrates the perceived position of the reflected enclosure and backdrop as they are viewed to appear a distance behind the image display device.

In FIG. 2 a user 1 looks forward at an angle of view 4 to view through a two-way mirror 2 to see an image plane on an image display device 3, which appears closer than a reflected backdrop 6. The user 1 views the sides of the backdrop enclosure 8 and the reflected backdrop 6 to be contained by the sides of the enclosure 8.

Figure 3:
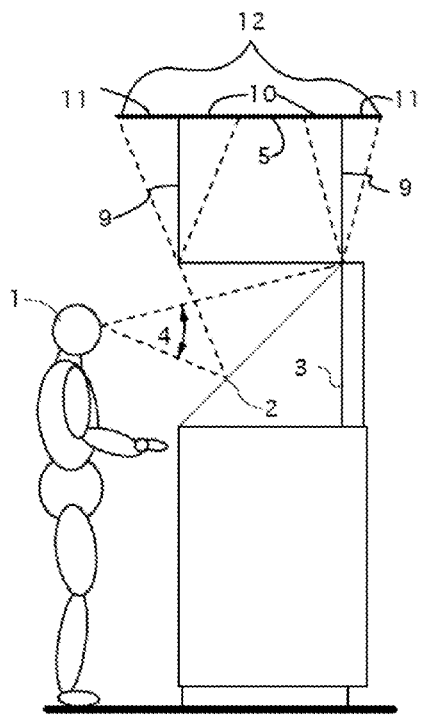
FIG. 3 illustrates an embodiment of the invention with a reflected view in a two-way mirror of an enclosure with internal mirrored sides and a backdrop at the back of the enclosure.

In FIG. 3 the user 1 views forward with an angle of view 4, which is reflected on a two-way mirror 2 angled to view a reflection of a backdrop enclosure that has mirrored sides 9. The mirrors on the sides of the enclosure 9 reflect inward to repeat a portion of the backdrop 10 and these reflections appear to extend the sides 11. As a result, the surface of backdrop 5 appears to be extended by the reflections 11 to achieve an apparent total backdrop surface 12.

Figure 4:
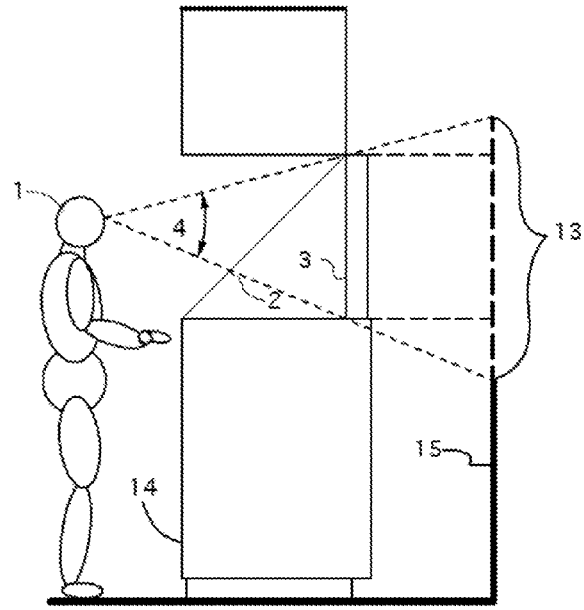
FIG. 4 illustrates the perceived position of the mirrored enclosure as it is reflected in the two-way mirror to have an extended plane of the backdrop appear to match the position of a wall located behind the kiosk.

In FIG. 4 the user 1 views forward with an angle of view 4 to see through the two-way mirror 2 to see the image plane 3 appearing to be closer than the total backdrop reflection surface 13. It is possible to position the kiosk 14 a distance from a wall 15 to match the apparent location of the plane of the reflected backdrop 13. The reflected backdrop 13 could have colors, patterns and textures to look similar to the surface of the wall 15 to give the impression that both are part of the same surface.

FIG. 5 is a plan view of FIG. 2. The user 1 is viewing forward with an angle of view 4 that sees through a two-way mirror 2 to the full width of the image display 3. This view 4 includes the view of the reflected sides of the backdrop enclosure 8 with the reflected backdrop 6 at the back. Since the reflected sides of the backdrop enclosure 8 extend as a visible plane back to the reflected backdrop surface 6, the user views an enclosed box with the reflected backdrop 6 at the back of it.

FIG. 6 is a plan view of FIGS. 3 and 4 with the user 1 viewing forward with an angle of view 4 to see through the two-way mirror 2 to the plane of the image display device 3 and a superimposed view of the reflected backdrop enclosure with an extended backdrop 13. The kiosk 14 can be positioned a distance from a wall 15 so that they appear to be on the same plane. In this plan view it is possible to see that the plane of the reflected backdrop 13 appears to extend out to the edge of the wall surface 15. Therefore, the user 1 sees the wall 15 and the reflected backdrop 13 appearing to be a seamless surface.

FIG. 7 is the same as FIG. 6 except that the user 1 is viewing from a position offset to the side. In this offset angle of view 17 the user 1 sees through the two-way mirror 2 to see the image display plane 3 closer than the superimposed reflected backdrop surface 13. This view 17 shows that the overall reflected backdrop 13 extends in the same plane as the wall 15. As a result, the user has a visual effect that the wall surface 15 and the reflected backdrop extended surface 13 are a seamless plane even when viewed from an offset angle.

Figure 8:
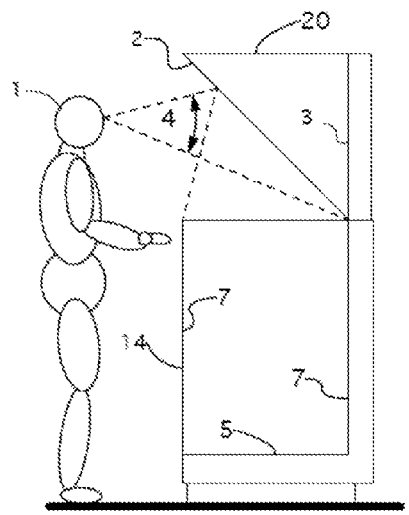
FIG. 8 illustrates another embodiment of the invention with the backdrop enclosure positioned below the two-way mirror.

FIG. 8 is similar to FIGS. 1 and 2 except that the backdrop enclosure 7 is below the two-way mirror 2 in the base of the kiosk 14. When the user 1 views forward with an angle of view 4 the two-way mirror 2 reflects a view downward toward the sides of a backdrop enclosure 7 and a backdrop 5. The user 1 also sees through the two-way mirror 2 to see the image plane 3. An opaque hood 20 may be positioned above the two-way mirror 2 to minimize light falling on the image plane 3.

Figure 9:
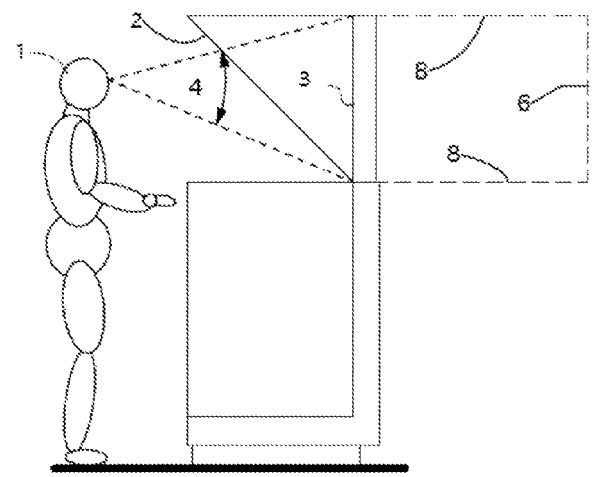
FIG. 9 illustrates the perceived location of the reflected enclosure with a backdrop.

In FIG. 9 the user 1 looks forward with an angle of view 4 that views through the two-way mirror 2 to see the image display 3 and the reflected backdrop enclosure with walls 8 and the backdrop 6. The reflected walls 8 contain the reflected backdrop 6 to be viewed at the back of a box.

Figure 10:
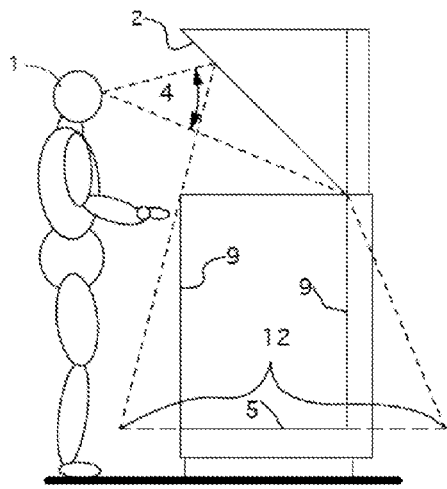
FIG. 10 illustrates an embodiment of the invention with a reflected view in a two-way mirror of an enclosure with mirrored sides to reflect a backdrop image.

In FIG. 10 the user 1 views forward in the angle of view 4 to see the reflection in the two-way mirror 2 of the mirrored sides of the backdrop enclosure 9 to see the backdrop 5 with reflections to create an extended backdrop plane 12.

Figure 11:
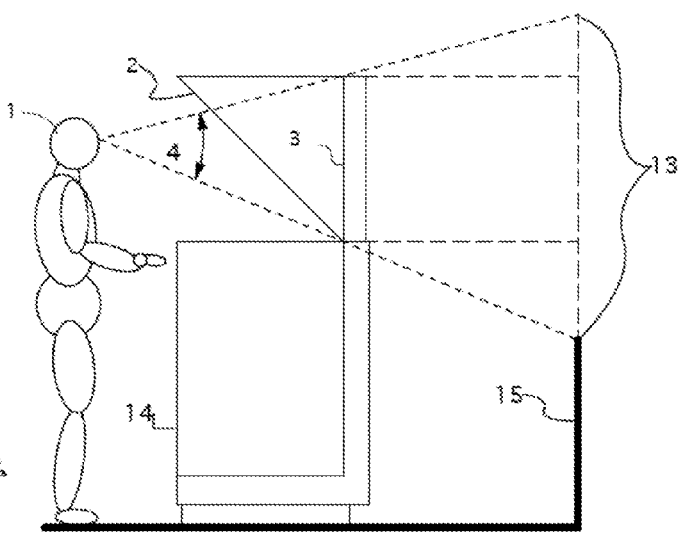
FIG. 11 illustrates the perceived position of the mirrored enclosure as it is reflected in the two-way mirror to have an extended plane of the backdrop with multiple reflections appear to match the position of a wall located behind the kiosk.

FIG. 11 illustrates the user 1 viewing forward in the angle of view 4 to see through the two-way mirror 2 to see the image display 3 with the reflection of the extended backdrop 13. The kiosk 14 may be positioned to be the same distance from the wall 15 as the plane of the reflected backdrop 13.

Figure 12:
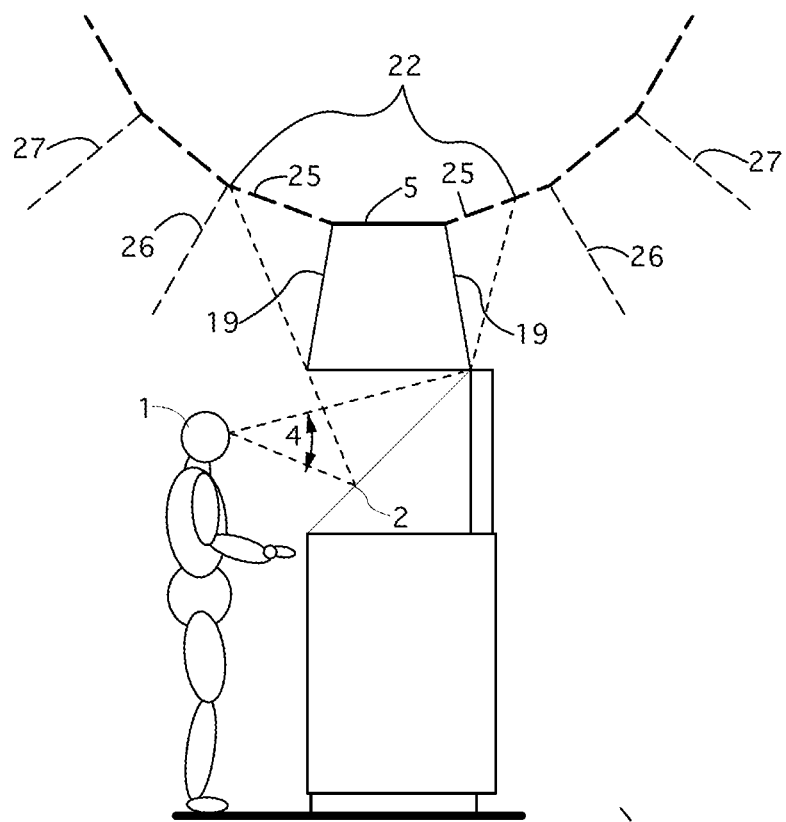
FIG. 12 illustrates an embodiment of the invention with an upward reflected view in a two-way mirror of an enclosure with mirrored sides in a trapezoidal shape angled inward to reflect a backdrop with multiple reflections forming an image in a spherical pattern.

FIG. 12 shows an embodiment of the invention that is similar to FIGS. 3 through 7, except that the mirrored sides of the backdrop enclosure 19 are trapezoids that are tapered inward. An edge of each mirror 19 adjoins an edge of the backdrop 5 such that the surface of each mirror 19 and the surface of the backdrop 5 form an obtuse angle at the line where the edges adjoin. In this illustration the user 1 views forward with an angle of view 4 toward a two-way mirror 2, which reflects the mirrored sides of the backdrop enclosure 20. These mirrored sides 19 reflect the backdrop 5 to display the reflected backdrop segments 25. Since the mirrored sides 19 are angled inward relative to the backdrop 5, they reflect at an angle away from the plane of the backdrop 5. With successive reflections of the mirrored sides 19 in a first repetition 26 and a second repetition 27 the extension of the backdrop 22 starts to form a spherical image.

Figure 13:
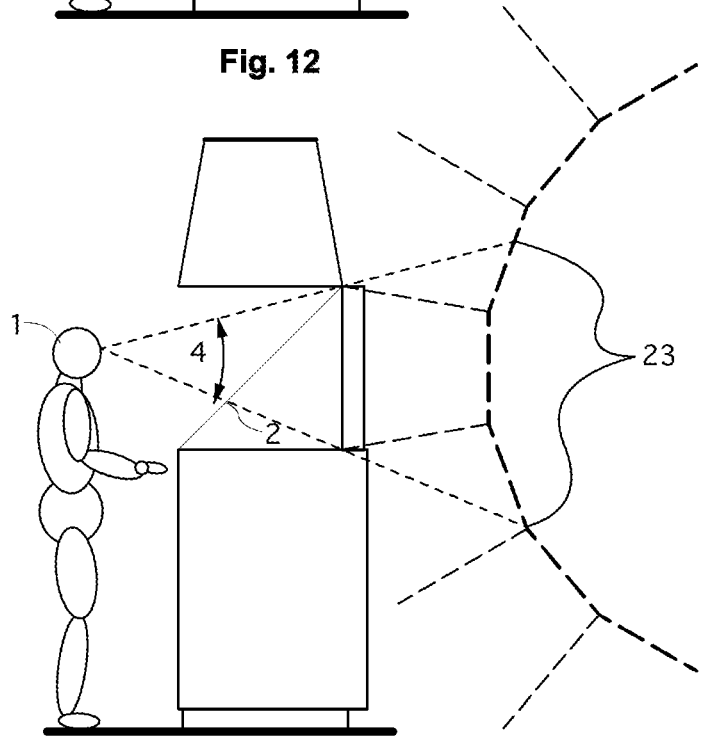
FIG. 13 illustrates the perceived position of the mirrored enclosure in FIG. 12 as seen as a reflection in the two-way mirror.

FIG. 13 shows the view of the user 1 looking forward with an angle of view 4 toward the two-way mirror 2 with a view of the reflection of the extended backdrop 23 as it forms a spherical image.

Figure 14:
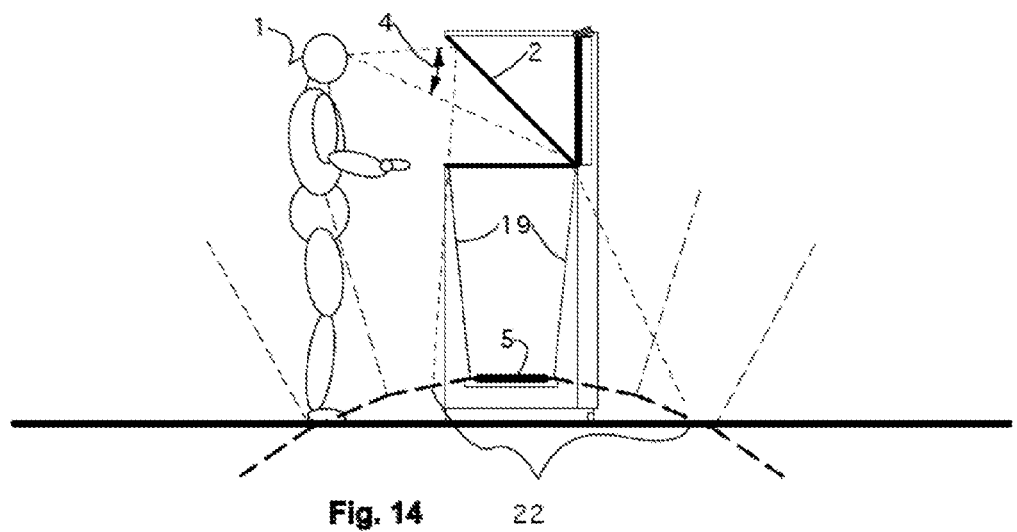
FIG. 14 illustrates an embodiment of the invention with a downward reflected view in a two-way mirror of an enclosure with mirrored sides in a trapezoidal shape angled inward to reflect a backdrop image forming a spherical pattern.

FIG. 14 shows an embodiment with the mirrored sides 19 and the backdrop 5 below the two-way mirror 2. Since the sides of the mirrored sides 19 are longer, the visible area of the overall backdrop image 22 shows a greater portion of the sphere. The length of the mirrored sides may be three or four feet depending on how much space is available in the kiosk structure.

Figure 15:
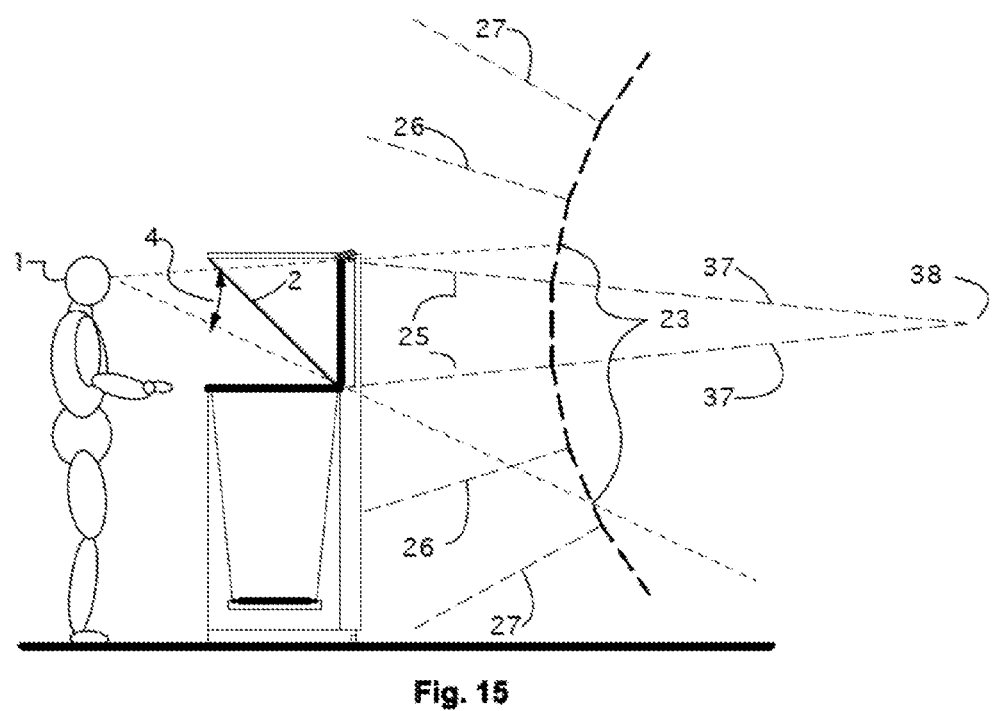
FIG. 15 illustrates the perceived position of the mirrored enclosure in FIG. 14.

FIG. 15 shows the user 1 with the angle of view 4 of the reflected backdrop enclosure sides 25 with the successive reflections 26 and 27 forming a spherical image with a visible area of the sphere 23. In this illustration the lines 37 represent the extension of the planes of the reflected mirrors of the backdrop enclosure 25 as they extend to a convergence at point 38. This point 38 can be used to determine the radius 37 of the visual image of the sphere.

Figure 16:
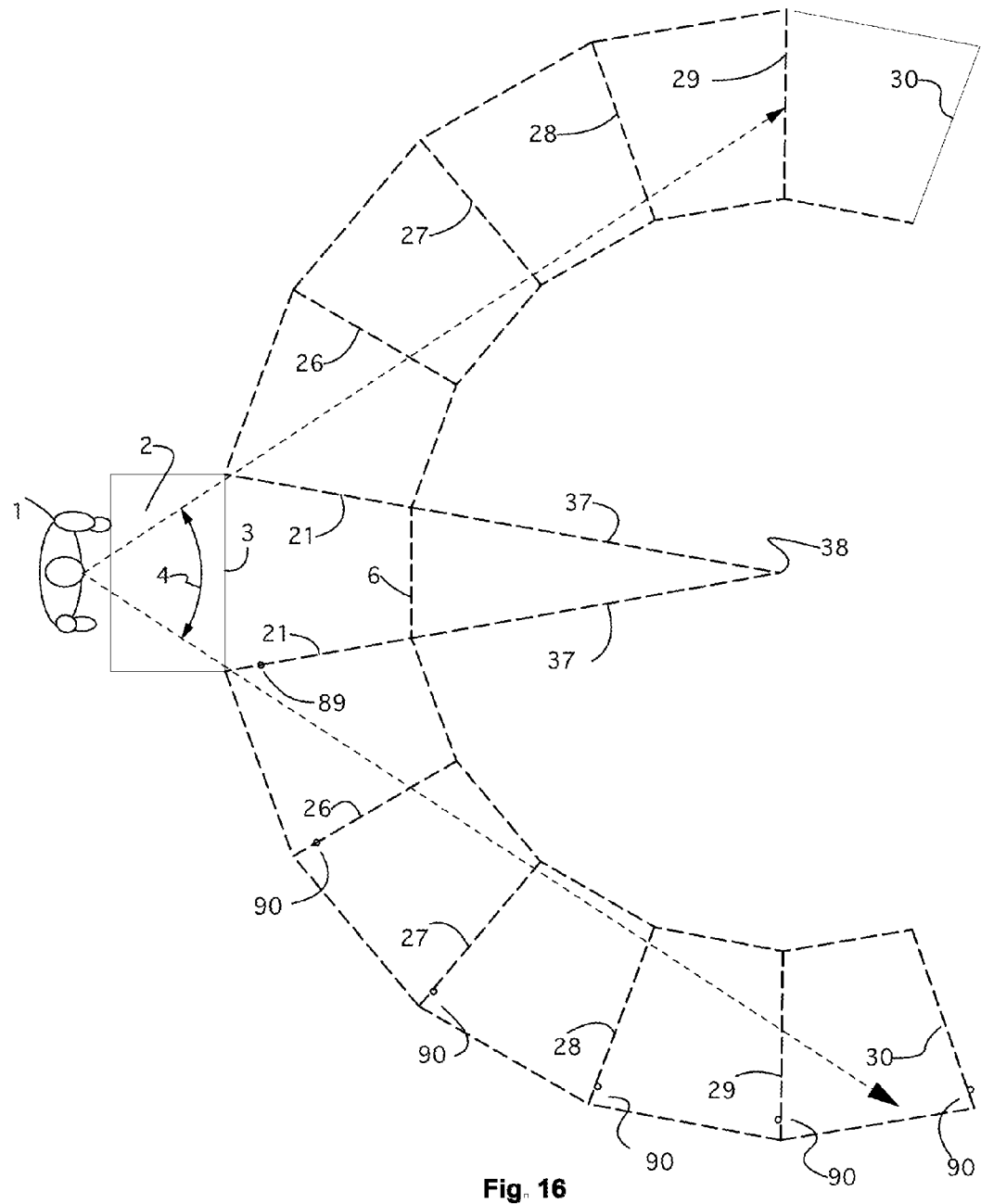
FIG. 16 illustrates a plan view of FIGS. 14 and 15.

FIG. 16 shows a plan view of FIGS. 14 and 15. In this view the user 1 has a wider angle of view 4 since the image display device 3 is a horizontal image with an aspect ratio that is wider than it is high. With this wider angle of view 4 the user can see the reflection in the two-way mirror 2 as a segment of a full spherical image. This spherical image is created by the successive reflections of the backdrop 6 reflected by the mirrors 21 and repetitions in 26, 27, 28, 29 and 30. Light sources 89 that are passed through the sides of the mirrored panel 21 will be repeated in the successive reflections of the sides 90. These lights can be fibre optic ends or small LED lights. The reflected lights 90 could form a starfield that would appear to surround the spherical image.

Figure 17:
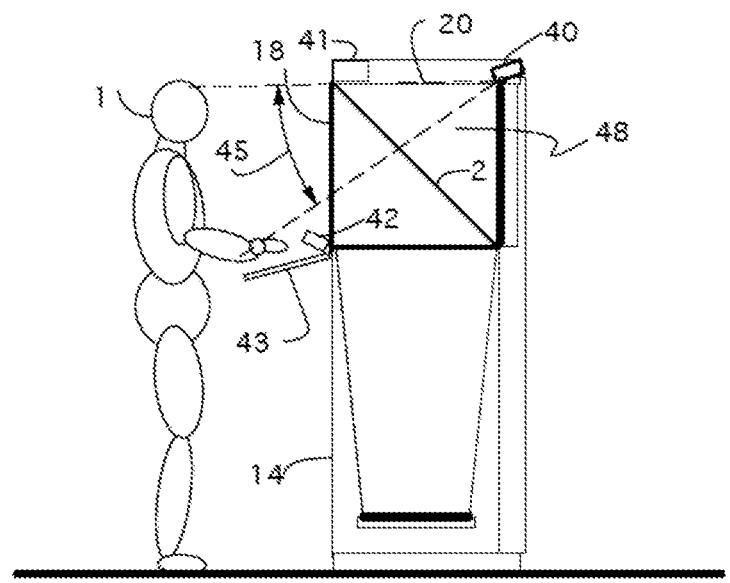
FIG. 17 illustrates an embodiment of FIGS. 14 through 16 and FIGS. 8 through 11 with the addition of an interactive device, camera, microphone and speaker.

FIG. 17 shows an embodiment of the invention with a camera 40 with a camera angle of view 45 viewing the user 1 through the two-way mirror 2. A hood 20 above the two-way mirror is black so that it does not add light to the camera view 45 as it is reflected in the two-way mirror 2. A speaker 41 and microphone 42 are added to the system for audio communication. A keyboard or interactive panel 43 is placed in a convenient location for a user 1. A clear transparent panel 18, such as a laminated anti-reflective glass panel, may be positioned at the front of the kiosk 14 so that it is closed on all sides to keep people from reaching inside or dropping items inside the backdrop enclosure. Side panels 48 may cover the sides of the kiosk in the area of the two-way mirror 2. These side panels 48 may be transparent substrates, such as clear plastic or laminated glass for safety. Side panels 48 of glass may have an anti-reflective coating.

Figure 18:
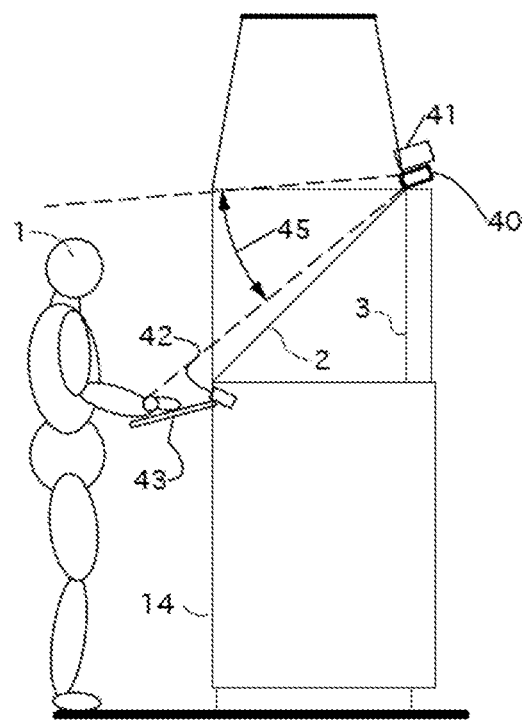
FIG. 18 illustrates an embodiment of FIGS. 41 through 7 and FIGS. 12 through 13 with the addition of an interactive device, camera, microphone and speaker.

FIG. 18 shows another embodiment of the invention with a camera 40 with an angle of view 45. The user 1 can interact with a keyboard or touch screen 43. A microphone 42 and speaker 41 may be incorporated for audio communication.

Figure 19:
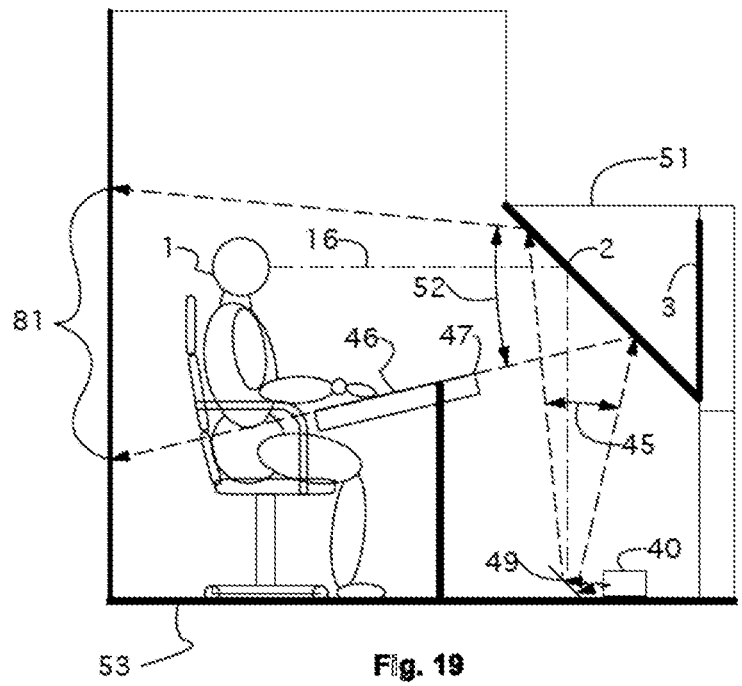
FIG. 19 illustrates an embodiment of the invention with a seated person viewed by a camera.

FIG. 19 illustrates an embodiment of the invention in a telepresence module 53, which is a complete self-contained telepresence system within an enclosure to hold one or more users 1. A camera 40 views forward to a reflective device 49, such as a front surface mirror or roof prism, which reflects the camera view 45 upward to the two-way mirror 2. Above the two-way mirror 2 is a light absorbing black panel 51 that will not add light to the camera angle of view 45 that views through the two-way mirror 2. The camera view 52 that is a reflection off the two-way mirror 2 views the user 1. The camera 40 has a line of sight 16 that positions the camera image of the user's eyes at approximately two-thirds of the height of the camera frame. The bottom edge of the camera view 47 is positioned to match the top edge of the table 46. The table 46 is angled to match the angle of the bottom edge of the camera view 47. The table 46 may incorporate capabilities as a human-computer interface, such as an interactive touch screen, Microsoft Surface, pressure sensitive command pads, projection surface, proximity sensor array, etc. The camera view 52 continues past the user 1 to view a background surface 81 on the back wall. This background surface 81 may be black to allow the camera to capture an image of the user 1 surrounded by black, which is transmitted to the location of another telepresence system for display of the user without an illuminated backdrop for being superimposed into a 3D telepresence display with a physical background on a plane positioned behind the image plane of the displayed user. The background surface may alternatively be a Chromakey color to be used to replace the color with black through Chromakey video equipment.

Figure 20:
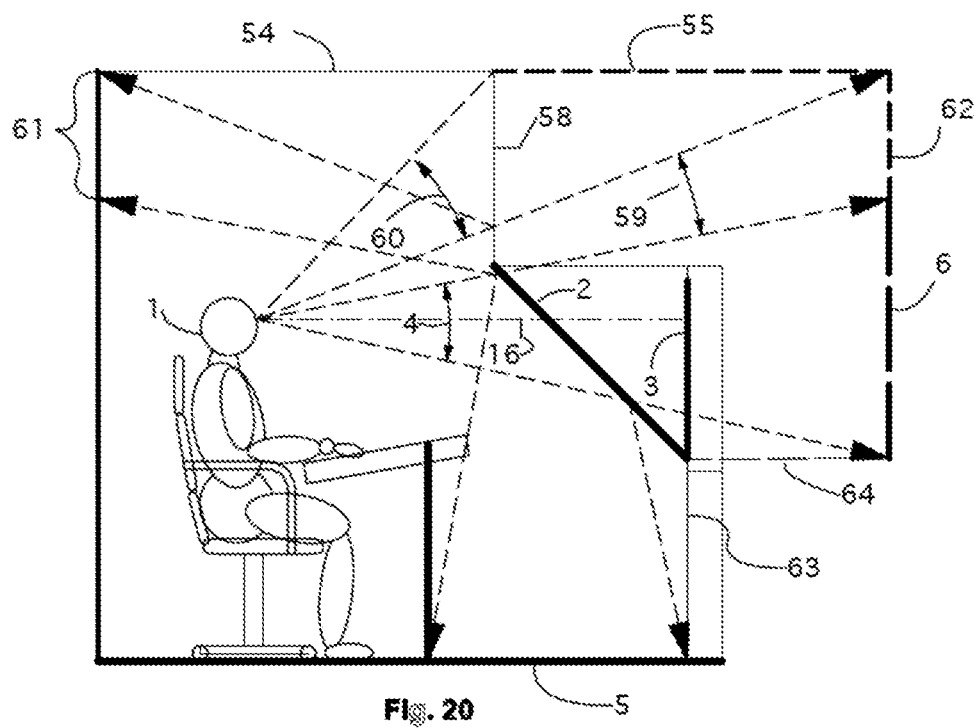
FIG. 20 illustrates the view of the user with a reflection of a section of the floor in the two-way mirror and a reflection of the back wall whereas both of the reflections appear to be on the same vertical plane.

FIG. 20 shows the views of the user 1. The user 1 looks forward on an eye level line of sight 16 through the two-way mirror 2 to the displayed image plane 3. This image plane 3 may display a user from another location transmitted to appear on the image plane 3 with his or her eyes at approximately two-thirds of the height of the image plane 3. In this manner the user 1 will have his or her eyes aligned on the eye level line of sight 16 to match the position of the eyes of the displayed remote user to achieve an apparent eye contact.

The user 1 views forward with an angle of view 4 toward the two-way mirror 2 to see a reflection of a floor panel 5, which is reflected to appear to be at a location 6 behind the two-way mirror 2. The vertical panel 63 is reflected in the two-way mirror 2 to appear as a horizontal panel 64.

A mirror 58 is placed in a vertical plane above the top edge of the two-way mirror 2. As the user looks upward in the angle 59, it sees a reflection in the mirror 58 of a portion of the back wall 61, which appears to be in the location of 62. The back wall with the top section 61 is positioned exactly at a distance from the mirror 58 that matches the location of the reflected wall section 62 in the same vertical plane as the location of the reflected floor panel 6. In this configuration the user 1 sees the location of the reflected floor panel 6 and the location of the reflected back wall section 62 as a seamless vertical wall.

As the user 1 views further upward in the angle of view 60 it sees the ceiling 54 reflected in the mirror 58 to appear in the position 55. With this configuration the user 1 will see both the ceiling 54 and the reflection of the ceiling 55 as a seamless ceiling.

Figure 21:
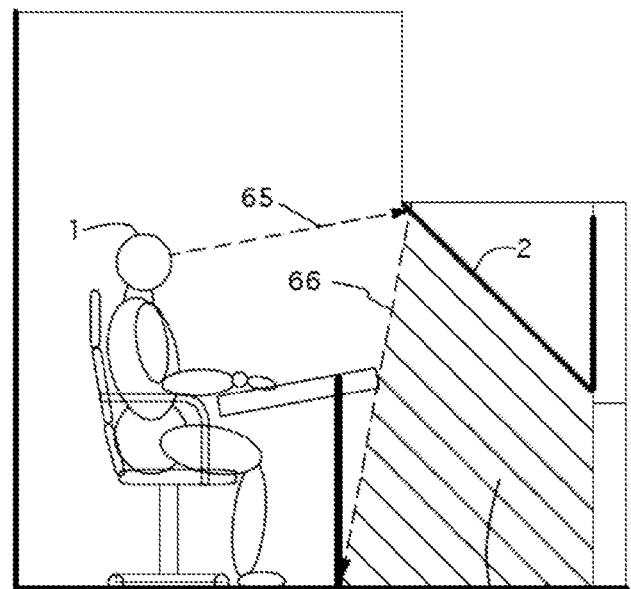
FIG. 21 illustrates a side wall with a pattern of lines at 45 degrees matching the angle of the two-way mirror.

In FIG. 21 the user 1 looks forward and to the side at a line of sight 65 and below to view a section of wall 67 that is positioned below the two-way mirror 2. The section of wall 67 is comprised of construction material that has visible lines 66 running at a 45 degree angle that is parallel to the angle of the two-way mirror 2.

The two-way mirror 2 extends to the full width of the telepresence module and is extended into the wall for support. This insertion into the wall produces a visible line at 45 degrees. It is desirable to obscure the awareness of the two-way mirror in order to achieve a perception that the reflection of the back wall is a true extension of the room.

Figure 22:
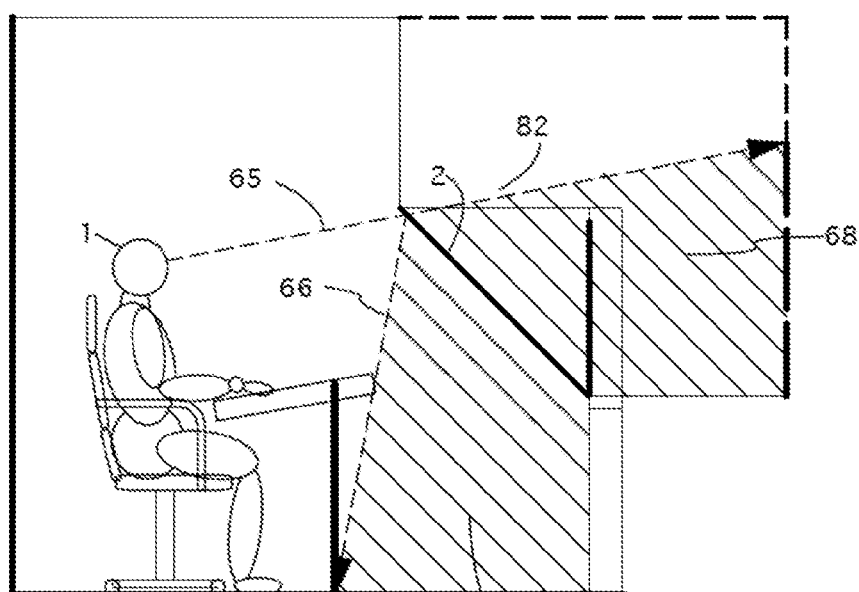
FIG. 22 illustrates the pattern of lines at 45 degrees with an extension of this pattern as a reflection in the two-way mirror.

In FIG. 22 the user 1 views upwards at a line of sight 65 and below to see the section of wall 67 reflected in the two-way mirror 2 to appear in a position 68. The reflected visible lines 82 in the section of reflected wall 68 appear to be parallel with the visible lines 66 in the wall section 67. In this configuration the wall section 67 and the reflected wall section 68 appear to be a continuous wall, which obscures the location of the visible insertion of the two-way mirror 2 into the wall.

FIG. 23 shows a close up detail of wall section 67 located below the two-way mirror 2. A narrow strip 70 is shown below the two-way mirror 2. This narrow strip 70 may be a darker value than the rest of the wall section 67 and it may be recessed further back than the plane of the wall section 67. This narrow strip 70 is parallel with the front surface of the two-way mirror 2. At a distance from the narrow strip 70 is a wider strip 71, which is parallel with the narrow strip 70 and the two-way mirror 2. The space between the narrow strip 70 and the wider strip 71 is a wall segment 83 that may be lighter in value.

FIG. 24 shows a method for producing the visual effect of the wall section 67 and reflected wall section 68 appearing to be a seamless wall while obscuring the 45 degree line produced by the insertion of the two-way mirror 2 into the wall. The narrow strip 70 is reflected in the two-way mirror 2 to appear as a reflection of another narrow strip 84. The narrow strip 70 may be dark in value and may be recessed into the wall section 67 so that the intersection of the two-way mirror 2 and the wall section 67 is not clearly visible. The result will be a dark strip that is the width of the narrow strip 70 and the reflection of the narrow strip 84. The wall segment 83 will be light in value and will be reflected in the two-way mirror 2 in the position of 85. A wider strip 71 is reflected in the two-way mirror to be in position 86. The wider strip 71 may match the combined width of the narrow strip 70 and the reflected narrow strip 84. The wider strip 71 will be reflected in the two-way mirror 2 as a reflection at the location of 86. The repetition of wider strips 71 over the surface of the wall section 67 may give the impression that the wall is comprised of wall segments 83. As an example, the wall segment 83 could be a wooden board 83 that is running at a 45 degree angle and the wall section 67 is comprised of boards with a space between them equal to the width of the strip 71. The resulting impression may be that the wall section 67 and reflected wall section 68 are a seamless wall of boards 83 running at 45 degrees.

A two-way mirror does not reflect 100% of light and therefore a reflection in the two-way mirror 2 is not as bright as the object being reflected. The wall section 67 will appear to be brighter than the reflected wall section 68. If the whole wall section 67 is the same brightness value, the reflected wall section 68 will be uniformly darker. In this arrangement it would be possible to see the location of the two-way mirror 2 at the division of the lighter wall section 67 and the darker reflected wall section 68. Therefore, the wall would not effectively obscure the location of the two-way mirror 2 and would not appear to be a seamless wall.

The challenge of producing a wall that appears to be seamless can be solved by specifying a pattern of different brightness values to the pattern of wall segments 83. It is possible to predict the perceived brightness of a reflected wall segment 85 compared to the direct view of a wall segment 83. The amount of difference in brightness can be exactly determined by the percentage of reflectivity of the two-way mirror 2. As an example, the reflected wall segment 85 may be half the brightness of the directly viewed wall segment 83. One configuration may be a series of wall segments 83 on the directly viewed wall 67 that decreases the brightness by half for each wall segment for a sequence part way down the wall and then increase the brightness as a repeated sequence. As this pattern of sequential changes of brightness is reflected in the wall section 68, it appears to be an extension of the sequence. There are numerous other patterns of variations in brightness that may achieve the same visual effect of obscuring the location of the two-way mirror 2.

FIG. 25 shows an extension of the wall section 67 to cover the full wall surface of the telepresence module 53. Below the line of view 65 the wall section 67 appears as a continuation in the reflected wall section 68. However, above the line of sight 65 the pattern is reflected in the mirror 58 as a pattern 72 that is reflected to appear at 90 degrees.

Figure 26:
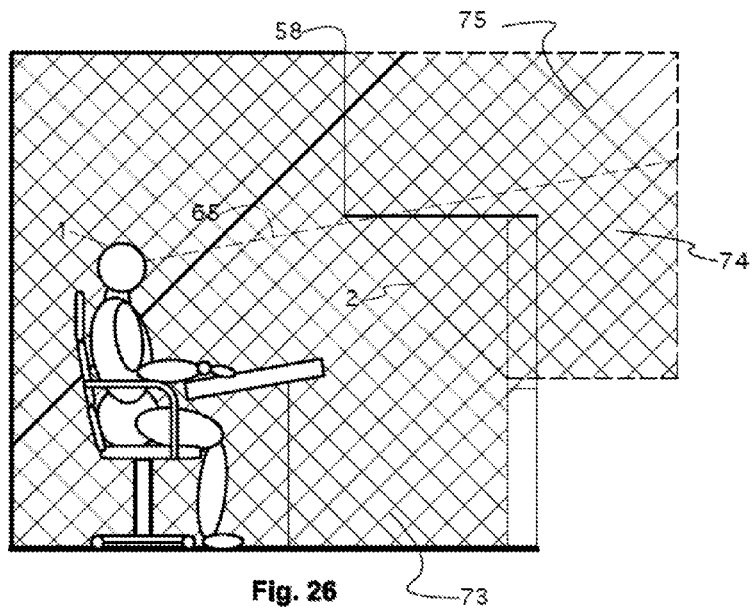
FIG. 26 illustrates the pattern of FIG. 25 with another set of lines at 135 degrees to produce a pattern of squares turned at 45 degrees that appears to be consistent in all direct viewing and reflected viewing.

FIG. 26 shows the addition of a second set of lines to produce a pattern of squares at 45 degrees. These could represent a wall covered with square tiles set at 45 degrees. Below the line of view 65 the wall section 73 with the square pattern is reflected in the two-way mirror 2 as a geometric pattern 74 that appears to be a seamless extension. This same pattern of the wall 73 is reflected in the mirror 58 as a wall section 75 that also appears to be a seamless extension.

Figure 27:
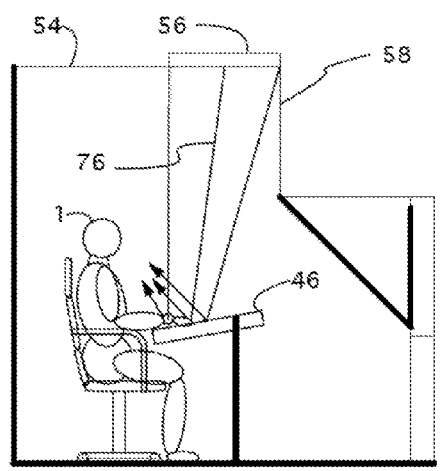
FIG. 27 illustrates the lighting of the display system with the downward light reflecting off a work surface into the eyes of the user.

FIG. 27 shows one of the important aspects of a telepresence solution, which is a work surface 46 to incorporate a means for the user 1 to interact with the communications system. This may be a table 46 with integrated technology for interaction, such as a touch screen or interactive surface. The surface of this interactive device 46 needs to be clearly viewed by the user. Also, the user 1 needs to be brightly illuminated to be seen clearly by the camera in the telepresence system. If a light fixture 56 is placed in the ceiling 54 it may cast light 76 on the surface of the interactive table 46, which could reflect into the eyes of the user 1. This could make it difficult for the user to clearly see the displays within the interactive table 46.

Figure 28:
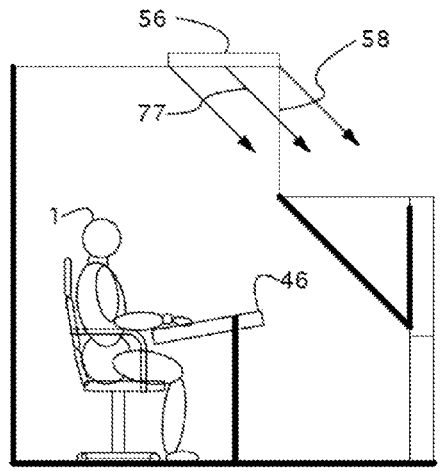
FIG. 28 illustrates the light of FIG. 27 with a device to direct it at 45 degrees toward a vertical mirror.

FIG. 28 illustrates how a light fixture 56 could incorporate an angled grill or optical system to direct light 77 forward at 45 degrees to be angled away from the eyes of the user 1 and not directed at the interactive table 46.

Figure 29:
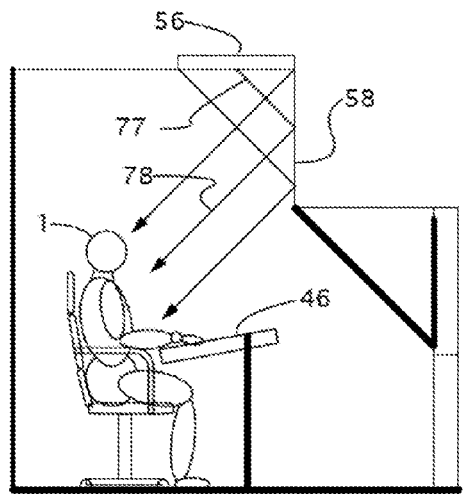
FIG. 29 illustrates the direction of the lighting in FIG. 28 as it illuminates the user without shining directly on the work surface.

FIG. 29 shows the light fixture 56 with light directed at 45 degrees 77 toward the vertical mirror 58 with the reflected light cast on the user 1. The light 78 is not cast on the interactive table 46.

Figure 30:
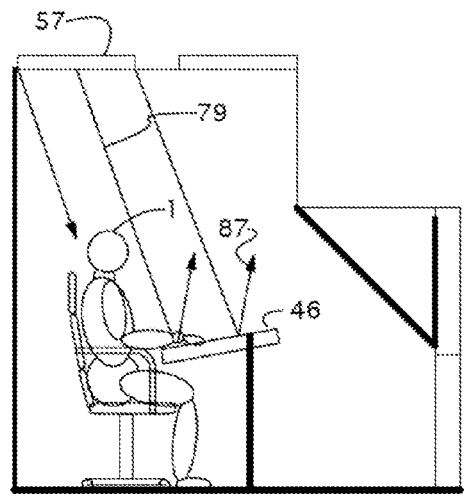
FIG. 30 illustrates a second light at the back of the system that illuminates the top of the user without reflecting off the work surface into the eyes of the user.

FIG. 30 shows a second light fixture 57 that casts light 79 on the top of the user 1 to provide a desirable highlight on the head and shoulders. This light 79 casts light on the interactive table 46 but it is reflected in a direction 87 away from the user 1.

Figure 31:
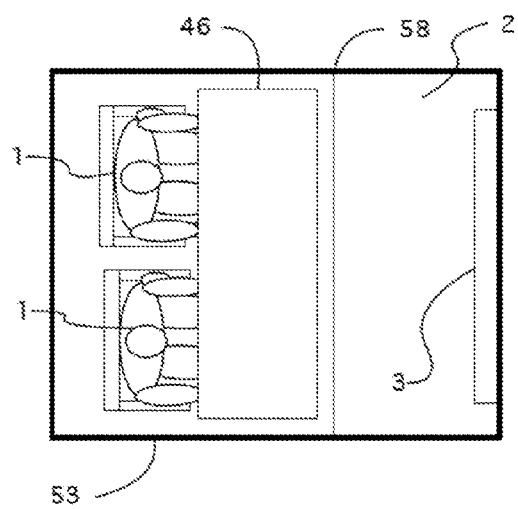
FIG. 31 illustrates a plan view of FIGS. 19 through 30.

FIG. 31 shows a plan view of a telepresence module 53, which is shown in side views in FIGS. 19 through 30. There may be one or more users 1 seated at an interactive table 46. The module has a vertical mirror 58 and a two-way mirror 2 with an image display device 3.

Figure 32:
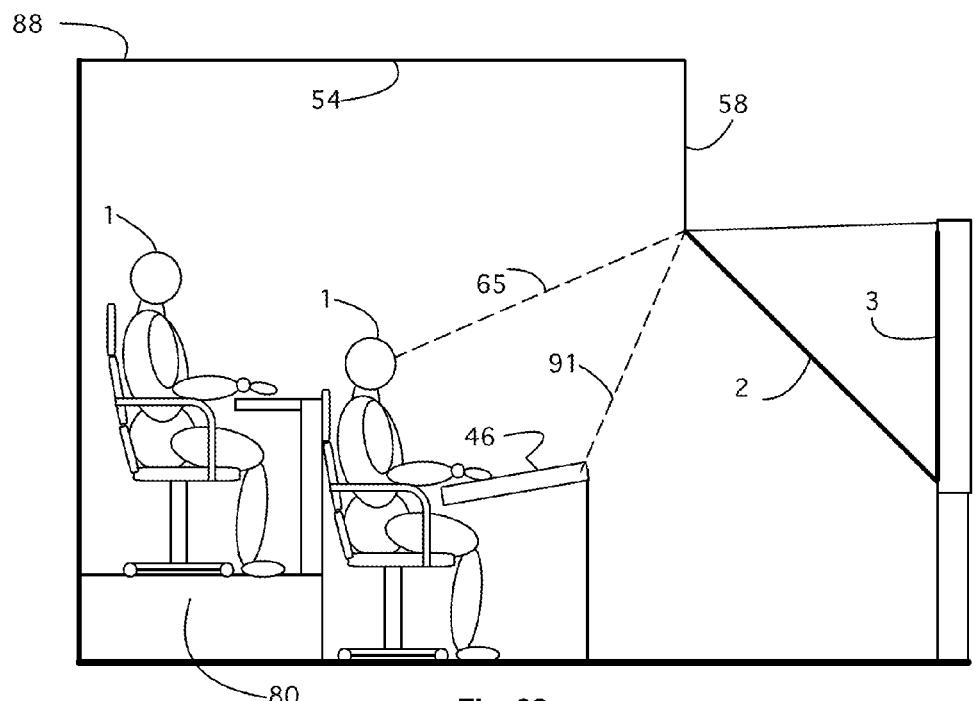
FIG. 32 illustrates a larger version of the display system of FIGS. 19 through 31 with placement of two rows of users.

FIG. 32 shows a larger configuration of a telepresence module 88. Users 1 are also in a second row on a riser 80. The second row of users are raised enough to clearly view the display 3. The interactive table 46 needs to be positioned far enough back from the two-way mirror 2 so that a line of sight 65 reflected off the two-way mirror 2 and the line of sight 91 does not overlap the top of the interactive table 46.

Figure 33:
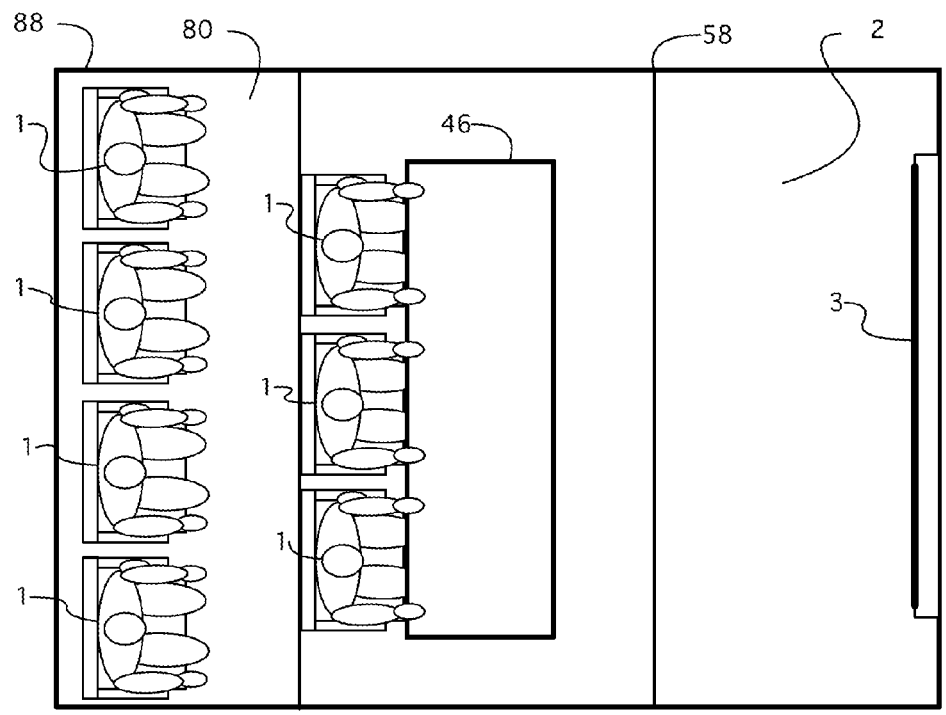
FIG. 33 illustrates a plan view of FIG. 32.
Figure 34:
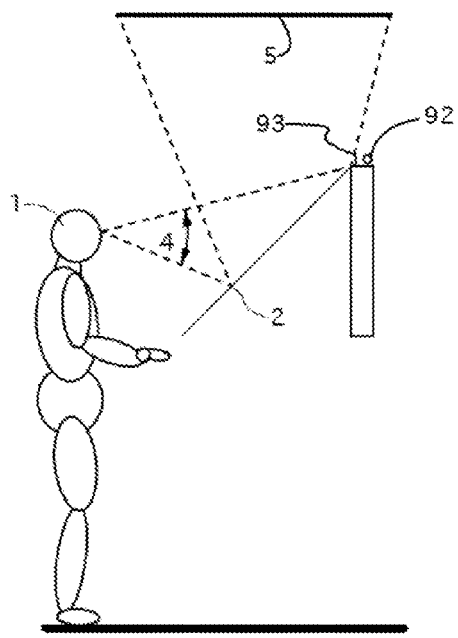
FIG. 34 illustrates a side view with an extended depth of the backdrop.

FIG. 33 is a plan view of FIG. 32. The two-way mirror 2 and the vertical mirror 58 extend into the side walls of the telepresence module 88. The front row may include three users 1 at an interactive table 46 and a second row on a riser 80 may include four users 1;

FIG. 34 shows a side view with a backdrop 5 that is large enough to span the full angle of view 4 as it is viewed by the user 1 as a reflection off the two-way mirror 2. This backdrop 5 may be a panel that is hung into a horizontal position above the two-way mirror 2. The backdrop 5 may be attached to a ceiling surface or may be an integral component of a ceiling. The backdrop 5 may be illuminated with a light 92. The light 92 may be hidden from view of the user 1 with the placement of a light baffle 93.

Figure 35:
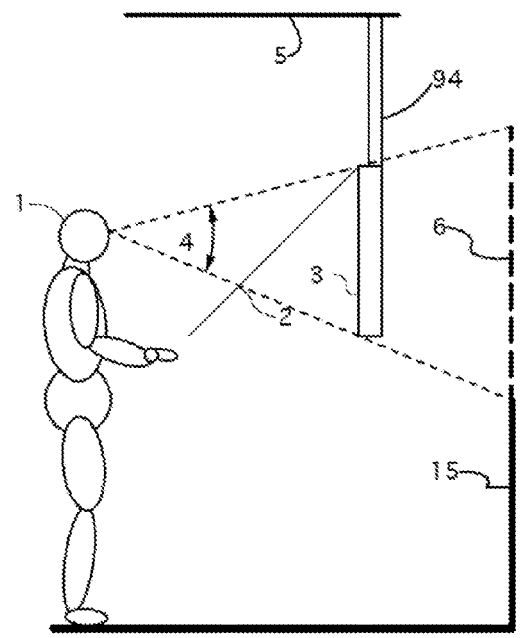
FIG. 35 illustrates a side view of FIG. 34 with the reflected backdrop matching the position of the plane of a vertical wall panel.

FIG. 35 shows FIG. 34 with the angle of view 4 through the two-way mirror 2 encompassing the full height of the image display device 3 with the reflected backdrop 6. The configuration may be positioned so that the vertical surface 15 and the reflected backdrop 6 appear to be on the same vertical plane. It may produce a perception of a seamless wall surface if the composition of the backdrop 5 matches the composition of the vertical panel 15. The composition of the backdrop 5 may be an acoustic panel, graphic panel or decorative panel that would appear to be natural in a placement on both the vertical plane and overhead horizontal plane.

Figure 36:
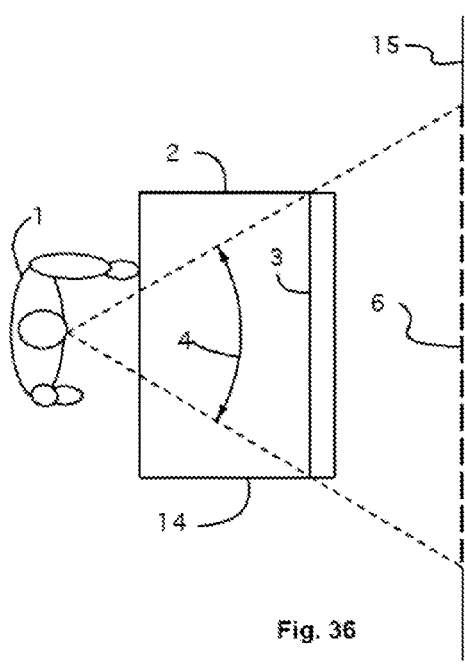
FIG. 36 illustrates the width of the backdrop in a plan view of FIGS. 34 and 35.

FIG. 36 shows a plan view of FIGS. 34 and 35 with the angle of view 4 through the two-way mirror 2 to encompass the full width of the image display device 3 with reflected backdrop 6. The configuration may be positioned so that a wall panel 15 matches the vertical plane of the reflected backdrop 6.

Figure 37:
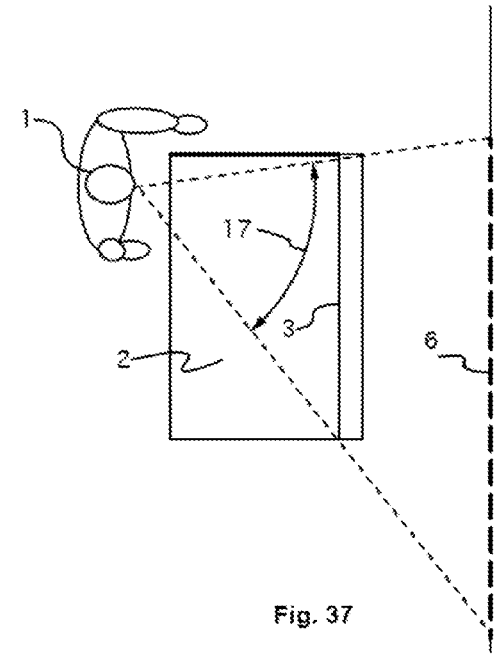
FIG. 37 illustrates a plan view of FIG. 36 with the user view off the central axis.

FIG. 37 is a variation of FIG. 36 with the user 1 positioned off the central axis with an angle of view 17 through the two-way mirror 2 to the full width of the image display device 3 to view of the reflected backdrop 6. In this angle of view 17 it is may be necessary for the reflected backdrop to be wider than in the angle of view 4 in FIG. 36. In commercial applications it may be determined that the width of the backdrop 5 in FIGS. 34 and 35 are limited in width to a practical size even though the reflected backdrop 6 may not cover the full off axis field of view 17.

Figure 38:
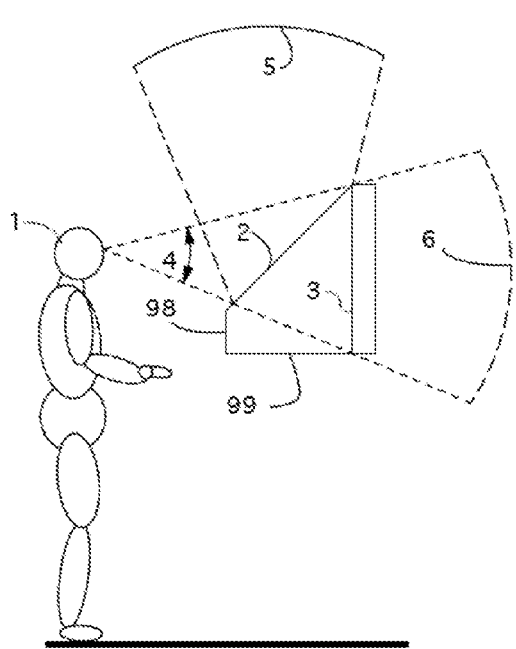
FIG. 38 illustrates a side view with a backdrop in the form of a concave surface.

FIG. 38 is a side view of an embodiment comprised of a two-way mirror 2, an image display device 3 and an overhead backdrop 5 that is not flat. The backdrop 5 may be an irregular surface in the form of a single curve, multiple curves or a multi-faceted surface. It may be a surface that is curved in a single direction, such as a flat panel that is bent to form a curve. The curved panel may be curved to the radius of a circle, a parabolic curve or a curve derived from a formula to direct the reflection of sound. The backdrop 5 may be a surface in the form of a compound curve, such as a segment of a sphere, a segment of a paraboloid or a concave surface derived from a formula to focus the reflection of sound from a source to a predetermined zone.

The two-way mirror 2 is large enough to cover the field of view 4 of user 1 to see the full image display device 3 with the backdrop 5 being reflected into a position 6 behind the image display device 3. However, the two-way mirror 2 does not extend to meet the horizontal plane 99 at the bottom of the image display device 3. Instead, a vertical panel 98 is positioned below the bottom of the field of view 4. By shortening the two-way mirror 2 at this position the user 1 does not see a reflection of himself in the two-way mirror 2 or a reflection of the ceiling outside the coverage of the overhead backdrop 5. The vertical panel 98 may be transparent to allow for viewing of the image display device 3 from a lower position, such as from a wheel chair. The embodiment may be incorporated into a kiosk or lectern.

Figure 39:
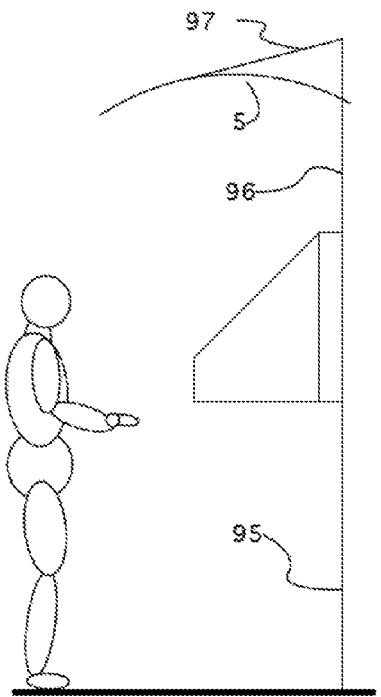
FIG. 39 illustrates FIG. 38 with a supporting structure.

FIG. 39 shows a side view of FIG. 38 with the embodiment of the visual display system mounted on a structural component 95, which could be a wall or a free standing supportive structure. The backdrop 5 could be hung from a ceiling or could be held in position with a supporting component 96, which could be a wall or free standing supporting structure. A brace 97 may be added to hold the backdrop 5 in position.

Figure 40:
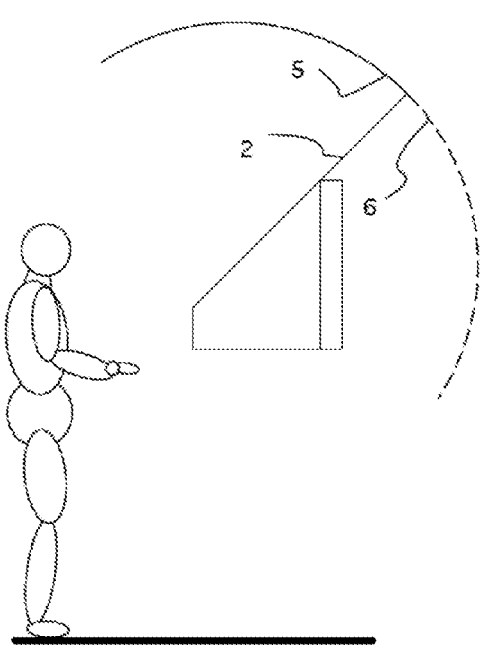
FIG. 40 illustrates a side view with the radius of the curved backdrop intercepting the plane of the beamsplitter at 90 degrees to produce a perception of the extension of the curved backdrop as a seamless curve into the area of the reflected backdrop.

FIG. 40 shows a curved backdrop 5 that extends to meet an extended two-way mirror 2. The backdrop 5 may meet the two-way mirror 5 at approximately 90 degrees to create a perception of a continuation of the curve into the reflected backdrop 6.

Figure 41:
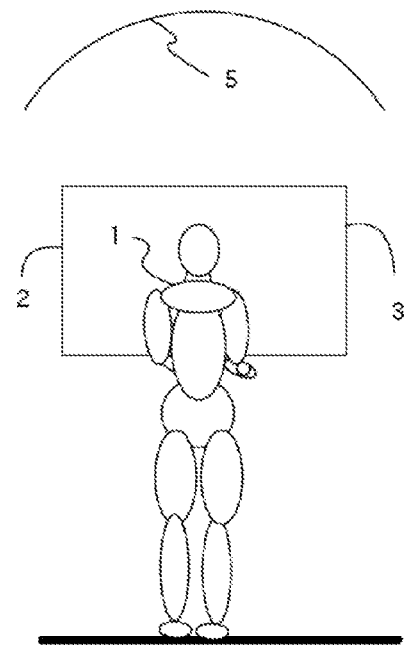
FIG. 41 illustrates a front view with a concave curved backdrop.

FIG. 41 is a front view of a user 1 looking forward through a two-way mirror 2 to see an image display device 3 with an overhead backdrop 5 that is not flat. Compared to the curved backdrop 5 in FIG. 38 that may be a single curve from the front to back, the backdrop 5 in FIG. 41 may be a single curve from the left to the right. The backdrop 5 may be an irregular surface in the form of a single curve, multiple curves or a multi-faceted surface. It may be a surface that is curved in a single direction, such as a flat panel that is bent to form a curve. The curved panel may be curved to the radius of a circle, a parabolic curve or a curve derived from a formula to direct the reflection of sound. Like the backdrop in FIG. 38, the backdrop 5 may be a surface in the form of a compound curve, such as a segment of a sphere, a segment of a paraboloid or a concave surface derived from a formula to focus the reflection of sound from a source to a predetermined zone.

FIG. 42 is a plan view of FIG. 41 with a backdrop that is not flat. In this configuration the field of view 4 from the user 1 views through the two-way mirror 2 at the full width of the image display device 3 with the reflection of the irregular backdrop 6 appearing behind.

FIG. 43 is a side view of FIGS. 38 and 39 with a user 1 in front of the visual display system with a two-way mirror 2 and image display device 3. An audio speaker 100 is placed above the image display device 3 and is angled to project sound toward the middle of the concave backdrop 5. The backdrop 5 is formed in a concave curve that is optimal for reflecting sound toward the zone of the user 1.

The concave curve of the backdrop 5 may be calculated by plotting a number of vectors as shown with 111 through 113. Vector 111 is directed vertically toward the backdrop 5, which is angled at this point of intersection to reflect in the direction of vector 114 toward the zone of the user 1. Vector 112 is directed to the middle of the backdrop 5. At this point of intersection the backdrop 5 is angled to reflect in the direction of vector 115 to the zone of the user 1. Vector 113 is directed to the outer edge of the backdrop 5. At this point of intersection the backdrop 5 is angled to reflect vector 113 in the direction of vector 116 toward the zone of the user 1. In order to plot a smooth curve it may be necessary to plot a large number of vectors across the curve of the backdrop. It may be possible to create a formula for a computer to calculate a smooth curve that would reflect sound from a location of a speaker 100 to a focal point in the location of a user 1.

The concave curve of the backdrop 5 may be a single plane that has been formed to the plotted curve from the front to the back of the visual display system. Or the backdrop 5 may be a compound curve that is based on the plotted curve of the side view and the plotted curve of the front view.

FIG. 44 shows a front view of FIGS. 41 and 42 with a user 1 looking forward through a two-way mirror 2 toward an image display device 3 with a backdrop 5 in a concave curve. An audio speaker 41 is positioned above the image display device 3. The curve of the backdrop 5 is calculated in the same method as described for FIG. 43. The vectors from the speaker 100 project toward the backdrop 5 in the directions of 121 through 124. The curvature of the backdrop 5 is plotted to reflect the sound from the audio speaker 100 toward the zone of the user 100 by the vectors 125 through 128.

The concave curvature of the backdrop 5 may be a single plane that is curved from the left to the right. Or the backdrop 5 may be a compound curve as described in FIG. 43.

FIG. 45 is the same configuration as FIG. 43, except that this figure illustrates the placement of a microphone in a position close to the speaker 41 shown in FIG. 43. The curvature of FIG. 43 is the same as the curvature of FIG. 45. The difference is that the direction of the sound is in the opposite direction. In FIG. 45 the vectors 131 through 133 project from the zone of the voice of the user 1. This sound of the voice of the user 1 is reflected off the backdrop 5 in the direction of the vectors 134 through 136 toward the microphone 101.

Figure 46:
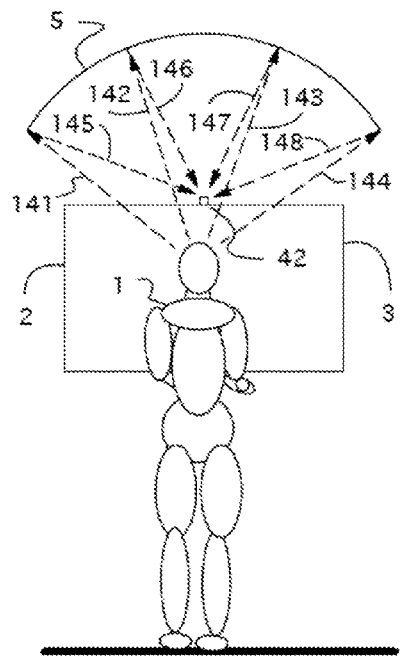
FIG. 46 illustrates a front view with sound from the user being focused by the reflection in the curved backdrop toward the microphone.

FIG. 46 is a front view of FIG. 44 with the user 1 facing the visual display system with a view through the two-way mirror 2 to the image display device 3. The curvature of the backdrop 5 is the same as FIG. 44, except that the audio speaker 41 of FIG. 44 is show as a microphone 42. The voice of the user 1 is projected out in vectors 141 through 144 and reflected off the backdrop 5 in the direction of vectors 145 through 148 toward the microphone 42.

Figure 47:
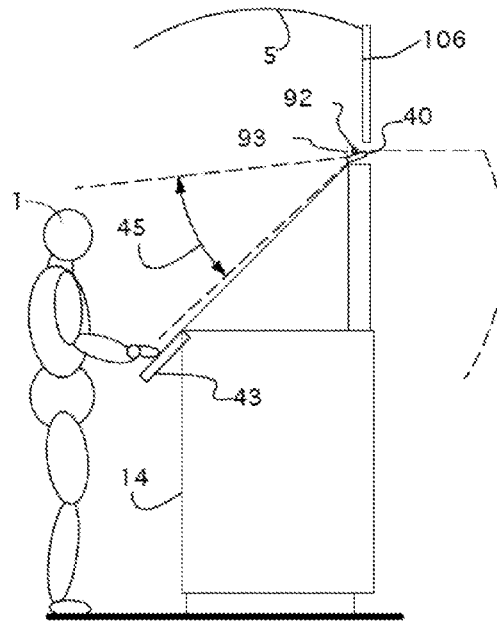
FIG. 47 illustrates a side view with a camera viewing the user and a touch screen interface with a light illuminating the backdrop and an acoustic panel.

FIG. 47 shows a side view of a configuration of the visual display system with a user 1 in front of a kiosk 14. A camera 40 has an angle of view 45 toward the user 1. A light 92 is positioned above the monitor 3 to illuminate a vertical panel 106. A baffle 93 may be placed in front of the light 92 to block light from being directly viewed by the user 1. The vertical panel 106 may be white or light in value to reflect light to illuminate the backdrop 5. The vertical panel 106 may be comprised of a sound absorbing material to improve the acoustic properties of the visual display system for receiving and projecting audio. A touch screen 43 is positioned for easy access by a user 1. The touch screen may be used for selecting content to be displayed on the image display device 3 of the visual display system.

Figure 48:
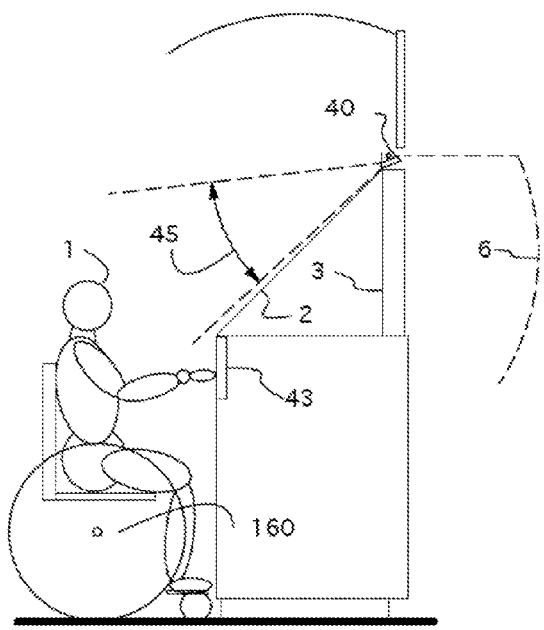
FIG. 48 illustrates a side view of FIG. 47 with a user in a wheel chair.

FIG. 48 shows FIG. 47 with the user 1 in a wheel chair 160. The touch screen 108 is angled downward to be clearly visible and easily accessible by the user 1 in the wheel chair 160. The camera 40 has an angle of view 45 to see the user 1. The user 1 can view through the two-way mirror 2 to the image display device 3 as it appears in front of the reflected backdrop 6.

Figure 49:
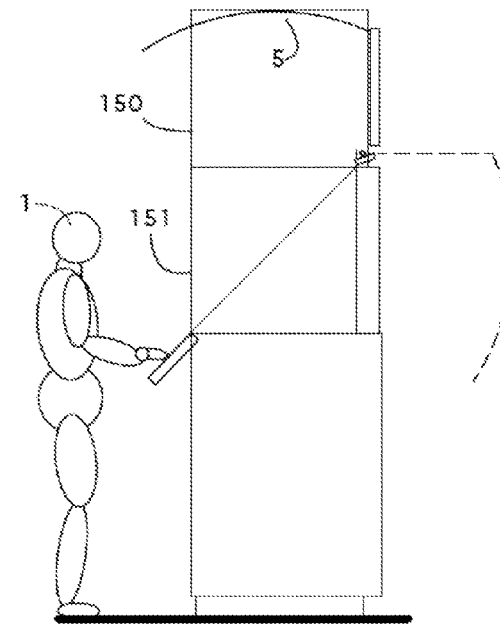
FIG. 49 illustrates a side view with mirrored panels on the sides of the curved overhead backdrop.

FIG. 49 shows the image display system of FIG. 47 with the addition of side panels 150 and supporting structure 151 to support the backdrop 5. The side panels 150 may be mirrored facing the inside of the image display system. The side panels 150 may be covered with promotional graphics or a decorative material facing the outside of the image display system. The supporting panels 151 may be transparent to allow for a view into the image display system from the side. The supporting panels 151 may be glass that is tempered or laminated for safety. Alternatively, the supporting panels 151 may be a clear plastic, such as Acrylic or Lexan.

Figure 50:
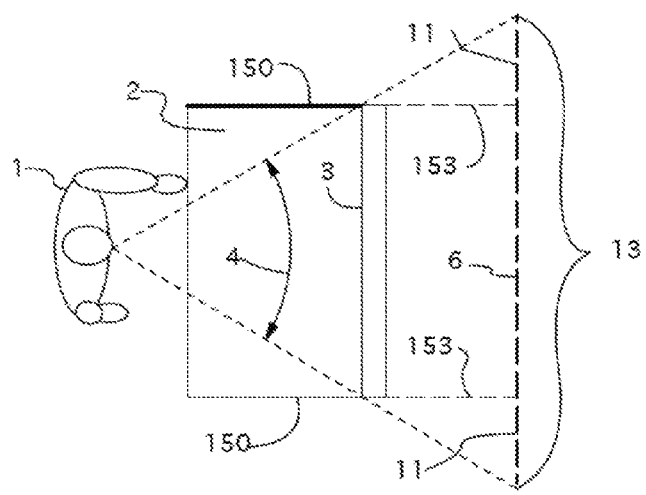
FIG. 50 illustrates a plan view of FIG. 49 with the curved backdrop reflected in the mirrored sides.

FIG. 50 is a plan view of FIGS. 47 through 49. The user 1 has an angle of view 4 that views the full width of the image display device 3 and a total width of a reflected backdrop 13 comprised of the reflected backdrop 6 and the reflected backdrop sections 11 of the reflection off the mirrored side panels 153.

Figure 51:
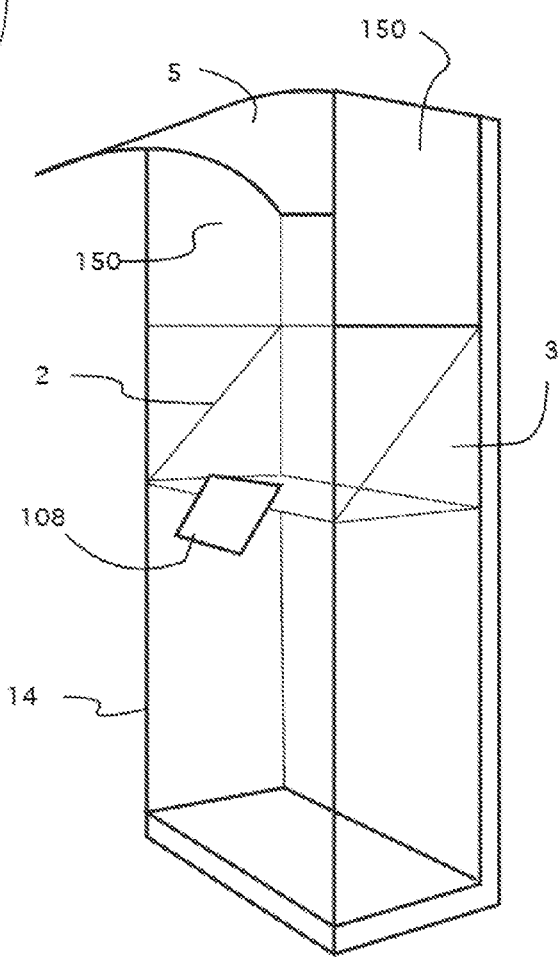
FIG. 51 illustrates a perspective view of FIGS. 49 and 50.

FIG. 51 is a perspective view of FIGS. 47 through 50. The kiosk structure 14 provides support. This structure 14 could be comprised of metal, plastic, wood, glass or other material. A touch screen 108 is positioned at the front of the system. The two-way mirror 2 is angled into position in front of the image display device 3. The backdrop 5 is held in position by the side panels 150. These side panels 150 could be transparent or could be comprised of an interior surface of mirror with an exterior surface of a graphic panel.

Figure 52:
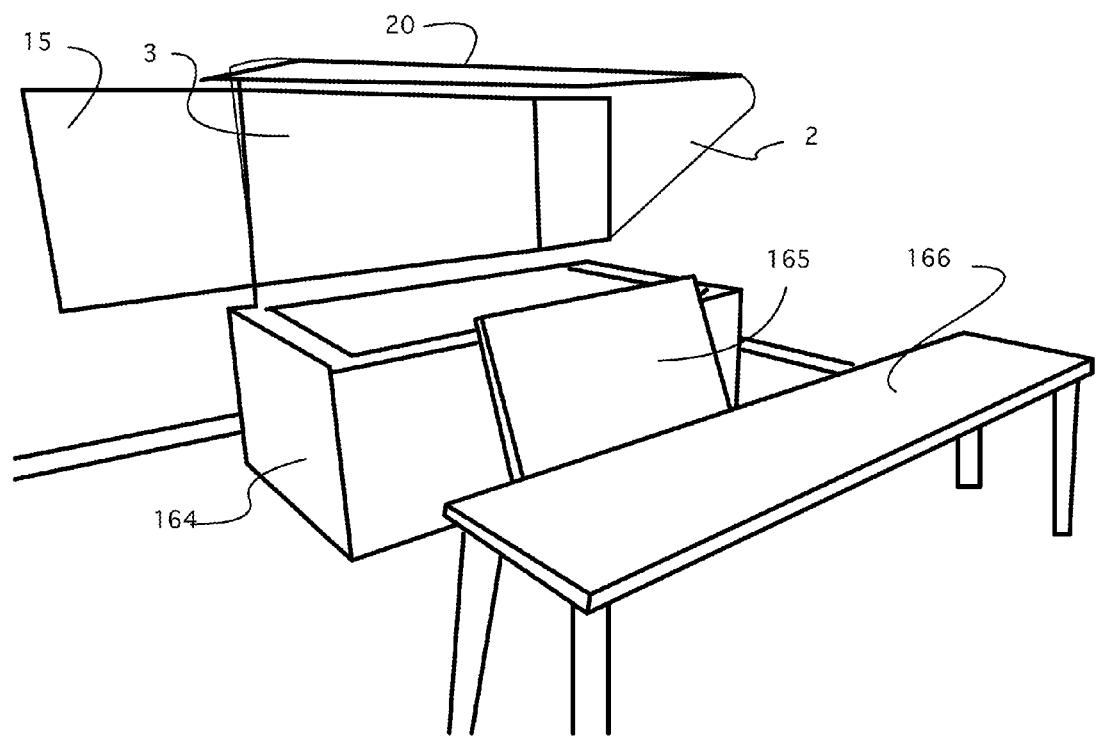
FIG. 52 illustrates a perspective view of FIGS. 6 and 7.

FIG. 52 is a perspective view of FIGS. 6 and 7. A telepresence system 164 is comprised of an image display device 3 behind a two-way mirror 2. A wall panel 15 is the same distance from the two-way mirror 2 as a backdrop in the telepresence system 164, which achieves a visual effect of a continuous plane at the position of the wall panel 15. A flat screen monitor 165 is positioned in front of the telepresence system to be used for the display of visual content and data for collaboration. A table 166 is placed in front of the telepresence system 164 for users.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An image display system comprising:
a contained space defined at least in part by two opposing vertical walls, each of the two opposing vertical walls comprising parallel visual markers, the parallel visual markers comprising first parallel indentations or parallel visible dark lines, wherein the parallel visual markers are intersected by perpendicular visual markers;
an image display device having an image area positioned within a first plane, the first plane positioned for viewing by a user in an observation zone of the contained space; and
a two-way mirror positioned between the observation zone and the image display device, the two-way mirror extending from one of the two opposing vertical walls to another of the two opposing vertical walls, the two-way mirror being positioned to reflect a surface of the contained space to a reflected second plane positioned for viewing by the user in the observation zone, the reflected second plane being parallel with the first plane and positioned further away from the two-way mirror than the first plane, the parallel visual markers of each respective one of the two opposing vertical walls being parallel to an intersection of the two-way mirror with the respective one of the two opposing vertical walls.

2. The image display system of claim 1, wherein the surface of the contained space comprises a floor surface below the two-way mirror.

3. The image display system of claim 1, wherein a vertical surface is positioned at a top edge of the two-way mirror, the vertical surface comprising a mirror, and from the observation zone, the vertical surface reflects an additional wall behind the user, the additional wall being placed at a distance from the vertical surface such that a reflection of the additional wall in the vertical surface appears co-planar with a reflected floor plane in the two-way mirror.

4. The image display system of claim 1, wherein the surface of the contained space comprises a ceiling surface above the two-way mirror.

5. The image display system of claim 1, wherein a camera is positioned to view the observation zone of the contained space.

6. The image display system of claim 1, further comprising a human computer interface in the observation zone for use by the user.

7. An image display system comprising:
an enclosed space defined at least in part by a first vertical wall, a second vertical wall, and a third vertical wall, the first vertical wall opposing the second vertical wall;
an image display device disposed along the third vertical wall and between the first vertical wall and the second vertical wall, the image display device being viewable by a user in an observation zone by a direct line of sight; and
a two-way mirror disposed between the first vertical wall and the second vertical wall, the two-way mirror intersecting the first vertical wall along a first intersection line, the two-way mirror intersecting the second vertical wall along a second intersection line, the two-way mirror being positioned to reflect a horizontal surface defining at least in part the enclosed space to a first reflected plane, the first reflected plane being viewable by the user in the observation zone and appearing at a distance further away from the user than the image display device.

8. The image display system of claim 7, wherein the horizontal surface comprises a floor of the enclosed space.

9. The image display system of claim 7, wherein the horizontal surface comprises a ceiling surface of the enclosed space above the two-way mirror.

10. The image display system of claim 7, wherein the first vertical wall comprises first parallel visual markers, the first parallel visual markers being parallel to the first intersection line, and wherein the second vertical wall comprises second parallel visual markers, the second parallel visual markers being parallel to the second intersection line.

11. The image display system of claim 10, wherein the two-way mirror is further positioned to reflect the first vertical wall and the second vertical wall to a second reflected plane and a third reflected plane, respectively, the first parallel visual markers collectively comprising a first brightness-gradient pattern that maintains continuity of the first vertical wall into the second reflected plane, the second parallel visual markers collectively comprising a second brightness-gradient pattern that maintains continuity of the second vertical wall into the third reflected plane.

12. The image display system of claim 10, wherein the first vertical wall comprises first perpendicular visual markers, the first perpendicular visual markers being perpendicular to the first intersection line and intersecting the first parallel visual markers, and wherein the second vertical wall comprises second perpendicular visual markers, the second parallel visual markers being perpendicular to the second intersection line and intersecting the second parallel visual markers.

13. The image display system of claim 10, wherein the first parallel visual markers comprise first parallel indentations or parallel visible dark lines, and the second parallel visual markers comprise second parallel indentations or parallel visible dark lines.

14. The image display system of claim 13, wherein the first parallel visual markers are twice a width of another visual marker appearing at a surface of the two-way mirror.

15. The image display system of claim 13, wherein the first parallel visual markers collectively comprise strips on the first vertical walls, the strips being in a range of brightness values that minimize a brightness difference between a direct view of at least one strip in front of the two-way mirror compared to a reflection of the at least one strip in the two-way mirror.

16. The image display system of claim 7, wherein a camera is positioned to view the observation zone of the enclosed space.

17. The image display system of claim 7 further comprising a human computer interface in the observation zone for use by the user.

18. An image display system comprising:
an image display device having an image area positioned within a first plane, the image area positioned for viewing by a user in an observation zone;
a two-way mirror positioned between the observation zone and the image display device;
a backdrop positioned so that a first reflection of the backdrop in the two-way mirror appears within a second plane positioned for viewing by the user, the second plane being parallel with the first plane and positioned further away from the two-way mirror than the first plane; and
a first mirror adjoining the backdrop and extending in a first direction toward the two-way mirror, the first mirror being positioned so that a second reflection of the backdrop in the two-way mirror and the first mirror appears within a third reflected plane positioned for viewing by the user, the first reflection being spatially distinct from the second reflection.

19. The image display system of claim 18, wherein the first direction is perpendicular to the backdrop.

* * * * *